(12) United States Patent
Craner

(10) Patent No.: US 8,627,389 B2
(45) Date of Patent: Jan. 7, 2014

(54) SYSTEMS AND METHODS FOR ALLOCATING BANDWIDTH IN SWITCHED DIGITAL VIDEO SYSTEMS BASED ON INTEREST

(75) Inventor: Michael L. Craner, Chester Springs, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 13/207,390

(22) Filed: Aug. 10, 2011

(65) Prior Publication Data
US 2011/0296475 A1    Dec. 1, 2011

Related U.S. Application Data

(63) Continuation of application No. 11/880,448, filed on Jul. 20, 2007, now abandoned.

(51) Int. Cl.
*H04N 7/173* (2011.01)

(52) U.S. Cl.
USPC ........... 725/94; 725/91; 725/92; 725/93; 725/95; 725/96; 725/114; 725/115; 725/116; 725/144; 725/145; 725/146

(58) Field of Classification Search
USPC ............ 725/91–96, 114–116, 144–146
See application file for complete search history.

(56) References Cited

U.S. PATENT DOCUMENTS

| | | | | |
|---|---|---|---|---|
| 5,386,493 A * | 1/1995 | Degen et al. | ................. | 704/267 |
| 5,512,934 A | 4/1996 | Kochanski | | |
| 5,692,213 A * | 11/1997 | Goldberg et al. | ............. | 715/203 |
| 6,005,564 A * | 12/1999 | Ahmad et al. | ................. | 715/723 |
| 6,061,056 A * | 5/2000 | Menard et al. | ................. | 715/704 |
| 6,370,688 B1 * | 4/2002 | Hejna, Jr. | ...................... | 725/101 |
| 6,622,171 B2 * | 9/2003 | Gupta et al. | .................. | 709/231 |
| 6,718,552 B1 | 4/2004 | Goode | | |
| 6,762,797 B1 * | 7/2004 | Pelletier | ....................... | 348/559 |
| 6,859,839 B1 | 2/2005 | Zahorjan et al. | | |
| 7,614,066 B2 * | 11/2009 | Urdang et al. | ................. | 725/34 |
| 7,788,393 B2 * | 8/2010 | Pickens et al. | ............... | 709/231 |
| 7,873,760 B2 * | 1/2011 | Versteeg | ........................ | 710/52 |
| 2002/0013949 A1 | 1/2002 | Hejna | | |
| 2002/0026644 A1 * | 2/2002 | Hatayama | .................... | 725/116 |

(Continued)

FOREIGN PATENT DOCUMENTS

| | | |
|---|---|---|
| JP | 11-177962 | 7/1999 |
| JP | 2003-169087 | 6/2003 |

(Continued)

OTHER PUBLICATIONS

"Information Technology—Generic Coding of Moving Pictures and Associated Audio Information—Part 6: Extensions for DSM-CC," International Standard First Addition, Sep. 1, 1998.

(Continued)

*Primary Examiner* — Jason Salce
(74) *Attorney, Agent, or Firm* — Ropes & Gray LLP

(57) ABSTRACT

Systems and methods for allocating bandwidth in a switched digital video (SDV) system based on channel interest. In some embodiments, bandwidth is deallocated from channels and allocated to requested channels having a higher interest. Tiered approaches for allocating bandwidth are disclosed. Embodiments in which QAMs are allocated across services in a multi-service system based on interest are also disclosed. Embodiments for accommodating emergency access system (EAS) functionality in a SDV system are also disclosed.

10 Claims, 16 Drawing Sheets

(56) References Cited

U.S. PATENT DOCUMENTS

| | | | |
|---|---|---|---|
| 2002/0059626 A1 | 5/2002 | Lemmons | |
| 2002/0170068 A1* | 11/2002 | Rafey et al. | 725/112 |
| 2003/0072556 A1* | 4/2003 | Okujima et al. | 386/46 |
| 2003/0099457 A1* | 5/2003 | Takahashi et al. | 386/46 |
| 2003/0149975 A1 | 8/2003 | Eldering et al. | |
| 2003/0165324 A1* | 9/2003 | O'Connor et al. | 386/69 |
| 2003/0208763 A1 | 11/2003 | McElhatten et al. | |
| 2004/0128690 A1* | 7/2004 | Zohar Ariely | 725/86 |
| 2004/0133907 A1 | 7/2004 | Rodriguez et al. | |
| 2004/0257939 A1* | 12/2004 | Kawamura | 369/47.23 |
| 2005/0123001 A1 | 6/2005 | Craven et al. | |
| 2005/0188415 A1 | 8/2005 | Riley | |
| 2005/0249130 A1 | 11/2005 | Schutte et al. | |
| 2005/0271357 A1* | 12/2005 | Adler et al. | 386/46 |
| 2005/0289618 A1 | 12/2005 | Hardin | |
| 2006/0034341 A1 | 2/2006 | Vasudevan et al. | |
| 2006/0218601 A1 | 9/2006 | Michel | |
| 2007/0022032 A1 | 1/2007 | Anderson et al. | |
| 2007/0116048 A1 | 5/2007 | Addington | |
| 2007/0121678 A1 | 5/2007 | Brooks et al. | |
| 2007/0180072 A1 | 8/2007 | Siripunkaw et al. | |
| 2007/0204311 A1 | 8/2007 | Hasek et al. | |
| 2007/0245371 A1 | 10/2007 | Quinard | |
| 2008/0170622 A1 | 7/2008 | Gordon et al. | |
| 2008/0175143 A1 | 7/2008 | Ansley | |
| 2008/0216136 A1 | 9/2008 | Pfeffer et al. | |
| 2008/0229379 A1 | 9/2008 | Akhter | |
| 2008/0320540 A1 | 12/2008 | Brooks et al. | |
| 2009/0025027 A1 | 1/2009 | Craner | |
| 2009/0025052 A1 | 1/2009 | Schlack et al. | |
| 2009/0271818 A1 | 10/2009 | Schlack | |

FOREIGN PATENT DOCUMENTS

| | | |
|---|---|---|
| JP | 2003-219340 | 7/2003 |
| JP | 2003-219367 | 7/2003 |
| WO | WO 03/032634 | 4/2003 |
| WO | WO 2005/022764 | 3/2005 |
| WO | WO 2005084031 | 9/2005 |
| WO | WO 2006113404 | 10/2006 |

OTHER PUBLICATIONS

"Model D9500 Switched Digital Video (SDV) Server," *Scientific Atlanta*, Apr. 2006. [http://www.cisco.com/en/US/prod/collateral/video/ps9159/ps9195/ps9258/product_data_sheet0900aecd806cec4a.pdf].

"Switched Digital Video & Cable's Looming Bandwidth Crisis: Executive Summary," *Heavy Reading*, vol. 5, No. 16, Dec. 2007. [http://www.heavyreading.com/details.asp?sku_id=2014&skuitem_itemid=1063&promo_code=&aff_code=&next_url=%2Fdefault.asp%3F].

"Switched Digital Video & Cable's Looming Bandwidth Crisis: Selected Key Findings," *Heavy Reading*, vol. 5, No. 16, Dec. 2007. [http://www.heavyreading.com/details.asp?sku_id=2014&skuitem_itemid=1063&promo_code=&aff_code=&next_url=%2Fdefault.asp%3F].

Nguyen, Jim & Ran, Oz, "Evolving Switched Broadcast Beyond First Generation Deployments," BigBandNet.com, SCTE Cable-Tec Expo Conference Presentation, 2006. [http://www.bigbandnet.com/index.php/tech_whitepaper_evolve.html].

Paryzek, Chip & Adams, Michael, "Raising the Bar on SDV," CedMagazine.com, Oct. 1, 2006. [http://www.cedmagazine.com/raising-the-bar-on-sdv.aspx].

Raz, Yaron, & Ronald, David, "What's Ahead For Switched Digital Video," CedMagazine.com, Dec. 1, 2006. [http://www.cedmagazine.com/Article-What-is-ahead-switched-digital-video.aspx].

Rovira, Luis et al., "Switched Digital Video," Cable360.net, Feb. 1, 2006. [http://www.cable360.net/technology/emergingtech/14909.html].

Spangler, Todd, "How Time Warner Austin Did Switched Digital," Multichannel News, Jun. 21, 2007. [http://www.multichannel.com/article/CA6454447.html].

Hua et al. "An Adaptive Hybrid Technique for Video Multicast," Proceedings of the International Conference on Computer Communications and Networks, Lafayette, USA, Oct. 12, 1998, pp. 227-234, XP010587052.

\* cited by examiner

SYSTEMS AND METHODS FOR ALLOCATING BANDWIDTH IN SWITCHED DIGITAL VIDEO SYSTEMS BASED ON INTEREST

BACKGROUND OF THE INVENTION

This invention relates to video distribution systems and more specifically switched digital video (SDV) technologies for improving the utilization of available bandwidth on these distribution systems.

In the current state of the art, SDV systems allocate channels to available bandwidth. Switched channels are assigned to available frequencies as they are requested. Today's SDV systems are typically designed with the assumption that the number of channels being requested will not exceed the available bandwidth. Thus, bandwidth constraints do not generally result in users being blocked from accessing channels they request. As video distribution systems evolve, however, the growing number of media sources and end-users may render this assumption invalid, as the probability that the interest for sources will exceed the amount of available bandwidth will increase.

SUMMARY OF THE INVENTION

In accordance with the principles of the present invention, systems and methods are provided for considering the interest for channels before allocation so that at any given time the channels with the greatest number of requesters are given preference in being allocated to the available bandwidth. By contemplating interest before allocation, only channels that have met a minimum threshold of requesters are made available, keeping bandwidth available for the most requested channels.

In some embodiments, systems and methods are provided for considering the interest of each allocated channel following allocation so that at any time a channel with very few users may be de-allocated from the bandwidth to make room for another channel with a relatively larger number of requesters.

A channel-interest manager considers the relative priority of a requested channel before allocating it to bandwidth. The channel-interest manager operates between the SDV server and an SDV client running on a user's equipment (e.g., set-top box, hereinafter "STB"). The channel-interest manager calculates the priority of a currently unallocated channel and determines whether that channel should be allocated, at least in part as a function of the interest for that channel relative to other channels in the system. The channel-interest manager may be any combination of hardware and software suitable for this purpose (e.g., one or more processors, memory, storage, etc., where the processors are programmed with suitable programming logic to perform the functions of the channel-interest manager). As understood to one skilled in the art, the channel-interest manager may be implemented on a stand alone server, co-hosted on a server with other applications, or integrated as part of another system application (e.g., the SDV manager) and operate cooperatively or as part of a system or SDV policy manager which considers other characteristics of the system in making dynamic decisions on which channels to allocate.

The channel-interest manager allocates the requested channel to available bandwidth if it meets the interest threshold and there is sufficient bandwidth available. If there is insufficient bandwidth, the channel-interest manager allocates the requested channel (after de-allocating or "bumping" another channel) if the requested channel meets the interest threshold and has a greater interest relative to other allocated channels. The channel-interest manager may determine that interest for a channel exceeds the interest threshold using any suitable approach.

In some embodiments, a request for an SDV channel is counted when a requester "parks" on it by tuning to it in an attempt to watch it and waiting until a channel is switched in. The channel-interest manager may decrement a request count when a requester tunes away. The channel-interest manager may also tag a requester who tunes away as "previously interested" so that when the channel is allocated at some future time, the "previously interested" requester may be notified. In other embodiments, requests are counted when a requester "votes" for the channel's allocation in advance of the scheduled time for the programming (e.g., such as by scheduling a reminder or a recording for a program). In various embodiments, feedback may be provided to the requester as to likelihood of channel allocation. The feedback can be used with an inter-active feature to give the requester the option to wait longer for possible allocation, or to tell the manager he or she is no longer interested. The allocation can also occur automatically with no interaction with the user.

In some embodiments, the channel-interest manager is made aware of program boundaries on switched channels. With this information, the channel-interest manager may determine that voting or parking by users on a channel at a particular timeframe represents interest in the content that is scheduled for that channel at the given timeframe (e.g., the start of the program).

Delays may occur in the allocation of the channel as a result of the voting and/or parking interest for the channel remaining below the threshold for the allocation of the channel. These delays might normally result in the users missing the beginning of the programming on the channel.

However, in some embodiments, when the channel interest manager detects that the channel interest for a channel may actually be a channel interest for a program beginning on that channel at a particular time but that the allocation may involve delays beyond that particular timeframe, it may buffer the channel for the users.

Such buffering may be accomplished by the channel-interest manager routing the channel content to a channel buffering subsystem until such time as the channel becomes available. Upon allocation of the channel, users may then be presented with the options of (a) joining the program in progress and missing the beginning or (b) watching the program from the beginning (e.g., similar to a start-over function). In the latter case, if the program is watched in real time, it's viewing may run beyond the beginning of the next program scheduled on this or another channel and this may be undesirable to the user. Therefore, in some embodiments, an option of watching the program in faster than real time is provided, or alternatively an option of skipping through some portions of the program may be enabled. This embodiment allows the program to fit into its regularly scheduled timeslot. Audio may be pitch controlled (e.g., by means of an audio processing technique such as the complex cepstrum) to maintain as close to the original pitch as the real-time playback while allowing the audio to be sped up in synchronization with the video.

In some embodiments, the SDV client may offer the requestor advertisements while the requester waits for allocation of bandwidth for a channel. In some embodiments, a delayed allocation is anticipated, a flexible number of advertisements or "filler" programming is provided (e.g., locally stored on a user's hard drive) and programs are pre-edited so they occupy less than the full time slot to accommodate these additional up-front advertisements or filler without loss of meaningful content (e.g., the conclusion to a detective program).

When sufficient bandwidth does not exist for a requested channel, the channel-interest manager may allocate bandwidth for the channel using any suitable approach. In some embodiments, a requested switched channel (or a previously switched in channel) may be degraded to a version that requires less bandwidth (e.g., SD rather than HD) before allocation is made. In other embodiments, requested channels meeting the interest threshold may "bump" a previously allocated channel with lower relative interest.

In some embodiments, the channel-interest manager may consider various "bump parameters" before de-allocating a channel. For example, the channel-interest manager may compare how long an allocated channel has been allocated with a "no-bump" threshold time and decide not to bump a program that might otherwise have been bumped if not for the fact that the program's allocation time exceeded this no-bump threshold and its de-allocation might be particularly disruptive to a viewer. A no-bump threshold might be, for example, ten minutes, or long enough for a watcher to become somewhat involved in the program he/she is watching.

In other embodiments, the channel-interest manager may work with a revenue manager and/or a trend manager and the interest may be considered in light of revenue impacts and trends before a channel is de-allocated. A revenue manager is software and/or hardware (e.g., one or more processors, memory, storage, etc., where the processors are programmed with suitable programming logic to perform the functions of the revenue manager) that compares the revenue potential (e.g., as a result of associated advertisement or pay-per-view fees) of the previously allocated channel to a requested channel before deciding whether or not to de-allocate the previously allocated channel. A trend manager is software and/or hardware (e.g., one or more processors, memory, storage, etc., where the processors are programmed with suitable logic to perform the functions of the trend manager) that measures the previously allocated channel's viewer activity over time before de-allocation. For example, if several users have tuned away from a channel at a given time it could just be because a commercial is present at that time, rather than an indication of waning interest. The number of users currently tuned at any given instant might not be an accurate indication of interest in such a scenario, and de-allocation of the channel would not be desirable or appropriate unless the general trend was moving in the direction of waning viewership over time. As another example, consider that a trend manager and a channel-interest manager, working alone or together, may de-allocate a first channel relative to another if the viewership of the first channel is below the other channel, however, when a revenue manager is employed, it may bring into consideration the revenue associated with viewership of the first channel as well. So, for example, if the first channel has advertisement spots that paid the video service provider twice per viewer what the advertisement spots on the other channel paid, it may be worth maintaining the allocation of the first channel until viewership of the first channel dropped below half viewership of the other channel. The trend manager would be invoked to insure that the maximized revenue trend is likely to be sustained.

In some embodiments, the interest management system may offer a requester, or a bumped-user, one or more options when a channel is not allocated immediately upon request. For example, in one embodiment, a requester may be provided with the option to watch the unavailable program as a pay-per-view program. The SDV channel may then temporarily be provided as a VOD stream and the user may be charged. Alternatively or additionally, the requester may be provided the option to set up a recording to record the program if it becomes available at a later time on a broadcast channel or via a switched channel at a time (e.g., early morning) when demand for bandwidth may have decreased. In some embodiments, the requester or bumped-user may be provided with an option to watch related content. In some embodiments the requester may be provided with an option to watch content that is popular at the moment. This feature may be extended in some embodiments to notify all users when a particular channel is extremely popular at any given time (e.g., breaking news).

In some embodiments, the channel-interest manager detects program overruns or other last minute scheduling changes associated with programs on non-SDV channels (e.g., broadcast channels). The channel-interest manager may then compare the number of viewers interested in watching these program overruns with the number of viewers interested in watching the regularly scheduled programming for those channels. This statistic may then be sent to the video service provider for consideration before determining which program to allocate to its regularly allocated broadcast bandwidth and which to make optionally available (subject to interest and available bandwidth) on its switched bandwidth allocation. The program not chosen for the regular broadcast bandwidth may be provided via SDV if the interest threshold is met. Moving a program overrun from a broadcast channel to a switched tier channel gives the video service provider the ability to allow viewers to watch the overrun if there is interest while not disturbing the regularly scheduled programming lineup that had been published for the broadcast channel. For example, if on the FOX network, a football game is scheduled from 7-9 PM followed by "House" at 9 PM, and it turns out that the game goes into overtime, the interest management system, in one embodiment, may cause a message to be displayed to a user via the on-screen display of a video terminal (e.g., STB) providing the user with the option to continue to watch the currently watched program or watch "House." Then, depending on interest, the user may be switched (seamlessly or not) to a channel where he can either watch the continuation of the overrun game or the episode of "House." In some embodiments, an option may also be provided (e.g., on a dual tuner STB) to record the program that is not watched. In some cases, if insufficient interest is logged for watching the end of the overrun program (e.g., e.g., the game is between two non-local teams of little interest to begin with) the overrun may not be made available at all and this fact may be provided to the potential watchers.

In some embodiments, channels of the SDV system are assigned to tiers. For example, there may be one SDV premium tier and discount tiers 1, 2, 3, etc. Lower tiers may, for example, be associated with a larger tune delay (all the way to not available) and a lower probability of being allocated.

The channel-interest manager may also allocate bandwidth for a program in a mixed-service system as a function of one channel's interest relative to another's and in some embodiments, additionally, the impact on revenue. For example, the channel-interest manager may consider the relative priority of VOD and SDV by considering the interest and revenue potential of each. In this way, VOD and SDV are competing for the same bandwidth and when no bandwidth is left, one channel must be blocked. In this example, the channel-interest manager allocates the bandwidth to the channel with the higher priority based on interest and revenue potential with the interest "registered" in advance by any of the mechanisms discussed thus far, including trending of advance requests to watch a particular program, consideration of trends for related programs or channels, consideration of the trend of users who watch a channel through program changes, etc.

In another embodiment, Emergency Alerts may be provided using a switched channel. This makes a good deal of sense given that Emergency Alerts are few and far between and it is thus wasteful to allocate a full channel to emergency alert when it is rarely watched. However, in the prior art, emergency alerts are always assumed to be on non-switched channels because of their importance and because of the classical way in which emergency alert are handled in video distribution systems such as Cable systems. In the first case, there is concern that in a classical SDV system, there is some small blocking probability for any switched channel and this blocking probability is independent of the interest for that channel. In some embodiments of the present invention, however, blocking probability is inversely proportional to the interest for a channel during a given window of time (e.g., the "interest assessment interval"). In classical emergency alert systems, when a STB receives an EAS alert, it is force tuned to the EAS channel. Under this circumstance, in the present invention, this would cause a peak in interest for the EAS channel (given that all STBs are requesting it concurrently) and this high interest for use would logically, absent revenue considerations, result in the EAS channel being quickly allocated. To avoid flooding the network with requests coincidentally from multiple video terminals, in some embodiments of the present invention, the EAS switched channel is treated as a special case by a STB wherein requests for it are delayed by a random backoff before being sent to the SDV server.

In some embodiments, all force tunes are treated with a random backoff before request in anticipation of these force tunes being sent to multiple terminals concurrently. In some embodiments, a flag is sent with a force tune to indicate that it is a broadcast or groupcast force tune and therefore should result in a random backoff before the channel is requested. When the channel-interest manager receives numerous requests that exceed the interest threshold, the EAS channel is then allocated to bandwidth that is ordinarily free for other channels absent an emergency.

In some embodiments, the EAS channel tuning information may be stored in a carousel data feed with a time to live of infinity (as a special mechanism only used for EAS) so that it persists in the carousel feed as an "active" channel and does not require a server response of which frequency and program number to use to tune the channel. Thus emergency alert channel tuning can be very fast. In such embodiments, though the EAS channel is listed as active in the carousel, it may not actually be allocated to the bandwidth until the alert is active. This embodiment involves notification of the server of the alert event, in which case the server switches the appropriate EAS program into the carouseled frequency and program number. The purpose of having the channel listed in the carousel is so that the STBs will know where to tune very quickly without having to request the channel from the server. The EAS channel is typically "hidden" from the user. The frequency and program number that is "reserved" for EAS may actually be in use for a "visible" channel. For example, in a cable system such as Comcast's cable systems, a hidden virtual channel number and a specific frequency and program number may be set aside for EAS. For example, frequency 550, program #3 and an infrequently watched channel such as "the muppets channel" may be allocated to virtual channel 53, frequency 550, program #2, the virtual channel number 53 being visible to the user.

Up to this point we have discussed the operation of the channel-interest manager primarily with respect to single-tuner STBs. However, it is anticipated that the manager will function similarly with respect to multiple-tuner STBs and STBs with the ability to handle multiple channels per tuner (e.g., multiple IP stream-based video/audio services or multiple channels within a multiple-service transport multiplex).

A multiple-tuner STB includes multiple tuners each with at least one associated decoder. Such a STB can tune to more than one channel at a time. A dual-tuner STB, for example, can tune to two frequencies simultaneously. Each tuner can extract a program from the multiplex it finds at its tuned frequency and an associated decoder can be used to decode the program. Thus, a dual tuner STB may be able to tune, extract, decode, and display two programs from two channels simultaneously. Note that the frequency and program number tuned by one tuner may be the same or different than the frequency or program number tuned by the other tuner.

In embodiments of the channel-interest manager system where multiple-tuner STBs are supported, the channel-interest manager may receive and manage requests and interest on a per-tuner basis instead of on a per-STB basis. In such embodiments, for example, with a threshold of two set for a channel, a single STB may meet that threshold of two by attempting to tune to the channel with both tuners. Also in such embodiments, two STBs, each STB tuned with one tuner to channel A, for example, and each STB tuned with the other tuner to channel B, for example, may result in an interest of two being logged for each of channels A and B at the channel-interest manager. Similar consideration would be given to multiple tuner STBs with greater numbers of tuners per STB (e.g., triple- and quad-tuner STBs or home media managers with multiple tuners). In such embodiments, both a tuner identifier and a STB identifier may be sent in the channel-request message from the STB to the channel-interest manager. In some STBs, there are multiple decoders available to each tuner. So, for example, such a STB with only a single tuner decodes and displays more than one channel at a time.

In embodiments of the channel-interest manager system where STBs with multiple decoders per tuner are supported, the channel-interest manager may receive and manage requests and interest on a per-decoder basis instead of on a per-STB or per-tuner basis. In such embodiments, for example, with a threshold of two set for a channel, it may be possible for a single-tuner STB with a concurrent decode capability of two decoders to meet that threshold by attempting to decode the same program from the same frequency using both decoders to the channel with both tuners. In such embodiments, a decoder identifier, in addition to a STB identifier, and perhaps a tuner identifier may be sent in the channel-request message from the STB to the channel-interest manager. Note that IP-video based STBs, including those which conform to the DOCSIS standard as well as those that utilize fiber to the curb or fiber to the home technology, typically are of the latter type of system which involve having multiple decoders per tuner. In the case of fiber optic supported STBs, the tuner may be replaced with the appropriate fiber optic receiver and switching circuitry.

BRIEF DESCRIPTION OF THE DRAWINGS

The above and other features of the present invention, its nature and various advantages will be more apparent upon consideration of the following detailed description, taken in conjunction with the accompanying drawings, in which.

DETAILED DESCRIPTION OF THE PREFERRED EMBODIMENTS

Figure 1:
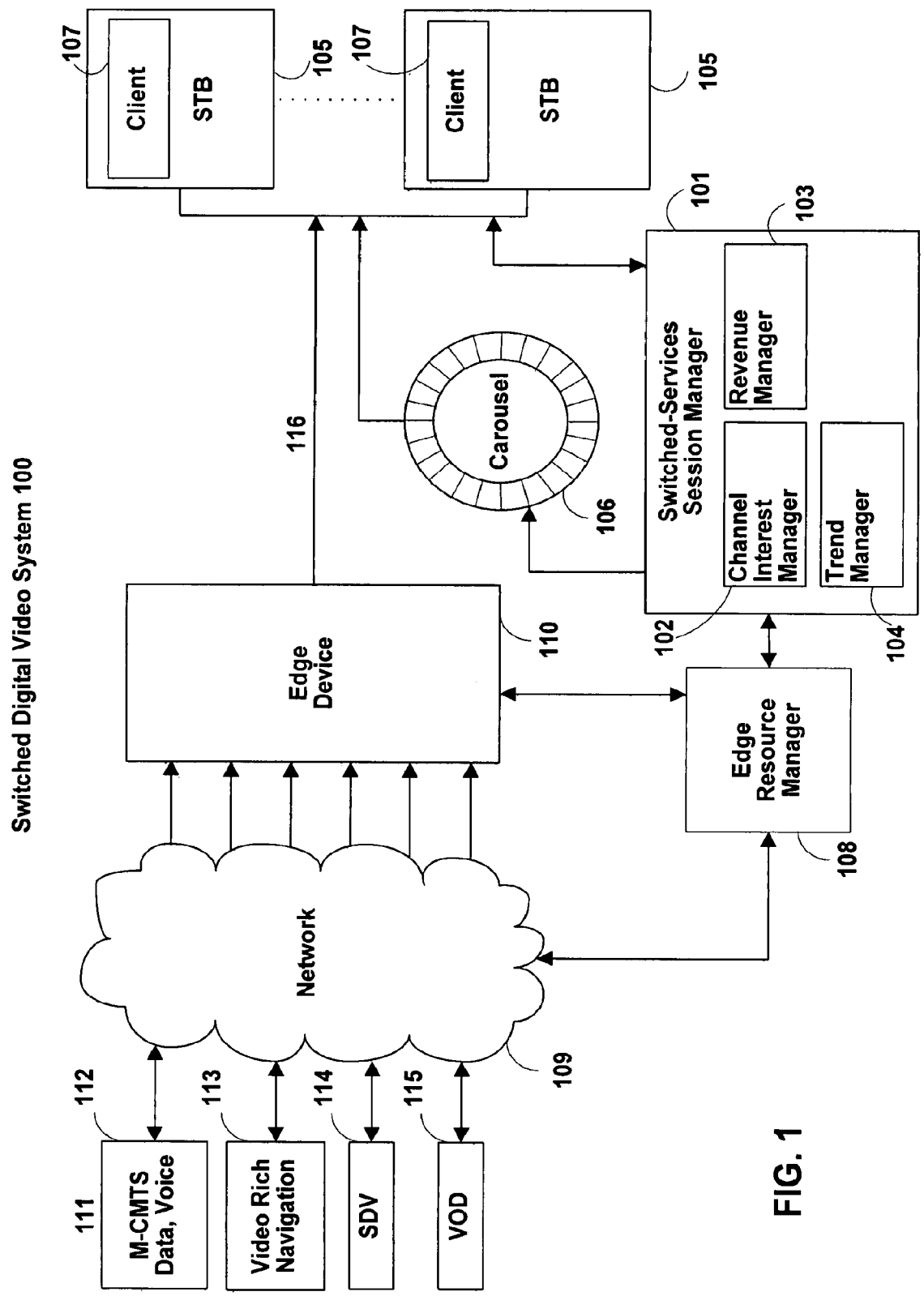
FIG. 1 is a diagram of an illustrative switched digital video system in accordance with one embodiment of the present invention.

FIG. 1 shows an illustrative switched digital video system in accordance with one embodiment of the present invention. In system 100, services and related content flow from sources 111 on the left, to user's set-top boxes (STBs) 105 on the right. In this example, there are four services. Sources 111 may be any suitable combination of hardware and software for providing the indicated services to edge device 110 via network 109. Source 112 provides: data and voice services (e.g., via modular cable modem termination system (M-CMTS) 112 which provides IP services over cable according to the data over cable system interface specifications (DOCSIS) published by CableLabs at www.cablelabs.com) such as video over IP and voice over IP (VOIP) services. Source 113 provides video for a video-rich-navigation (VRN) based interactive program guide (VRN guides are described in, for example, U.S. patent application Ser. No. 11/395,380, filed Mar. 30, 2006, which is hereby incorporated by reference herein in its entirety). Source 114 provides television channels as video streams for a switched digital video service. Source 115 provides video streams for a video-on-demand service. This list of sources is illustrative and it should be understood that any suitable services 111 may be included in the switched digital video system (e.g., Internet services).

Sources 111-115 modulate and packetize their services for transmission over network 109 to edge device 110. Network 109 may be, for example, a gigabit Ethernet network, and sources 111-115 may provide their services via TCP/IP and Ethernet and may include use of MPEG transport protocol. Edge device 110 (e.g., a Harmonic NGS9000 edge-QAM manufactured by Harmonic Corporation of Sunnyvale, Calif.) includes a bank of modulators. Each modulator (e.g., quadrature amplitude modulators) may accept a digital transport stream of roughly 3 Mbps representing a video program, multiplex it with other video transport streams, create a transport stream multiplex and modulate it onto the cable plant. A 256-QAM modulator, for example, will accept multiple digital transport streams (comprising a multiplex of approximately 45 Mbps) and modulate it to fit within an analog bandwidth of 6 MHz on a cable plant. Edge device 110 receives the services from network 109 and, under the control of edge resource manager (ERM) 108, allocates portions of modulators to the services. For example, edge device 110 may receive a command from ERM 108 to connect to a 3 Mbps service from network 109 that originated from a broadcast program source feeding SDV block 114. It may then allocate a program within one of its internal 256-QAM modulators. Edge device 110 may allocate a portion of a given QAM to VOD 115, instead of VRN 113, depending on the instructions from ERM 108. Or, edge device 110 may allocate QAMs (or not) among different channels of the SDV service 114. In this regard, QAMs may be shared flexibly and dynamically across services, or allocated in a fixed manner to specific SDV channels. For example, in a given configuration, four QAMs of an eight QAM edge device may be allocated to switched channels, two to VOD, one to cable modem, and one to VRN.

Edge device 110 allocates and de-allocates QAMs under the control of ERM 108. ERM 108 may be any suitable combination of hardware and software for performing its features described herein. For example, it may include control circuitry having include one or more processors (e.g., MIPs and/or Motorola 68000 family processors), memory (e.g., RAM, ROM, flash memory, and hard disks), communications circuitry, and any other suitable components for providing its features described herein. ERM 108 activates a controllable switch in network 109 (not shown) between network 109 and edge device 110 to direct what services (or portions of services) are coupled to the inputs of edge device 110. ERM 108 instructs edge device 110 to QAM modulate an input signal onto a carrier frequency. ERM 108 may specify a QAM and track what services or channels are modulated on given QAMs (e.g., using a lookup table), or may simply instruct edge device 110 to allocate a given input and edge device 110 returns the carrier frequency and program number. ERM 108 typically informs switched-services session manager (session manager) 101 of the carrier frequency and program number where the channel can be found. The session manager 101 in turn inserts this information into the active channels list in carousel data feed 106. Carousel data feed 106 acts as a quick-lookup channel map for set-top boxes 105. Carousel 106 may be transmitted in-band with, or out-of-band from, the other channels and/or services on a cable plant.

Edge device 110 modulates services and channels and transmits them to STBs 105 of a plurality of subscribers over, for example, an analog or digital cable plant or via an analog or digital terrestrial broadcast system. For clarity, FIG. 1 shows only the embodiment where edge device 110 transmits the channels and/or services over a single path 116. Path 116 may be a standard hybrid fiber/coax path, full fiber path or satellite, or other high speed data path. In some embodiments, Internet Protocol (IP) is used to transmit the channels and/or services to STBs 105.

STBs 105 include switched digital video clients 107. In some embodiments, clients 107 communicate with an interactive media guidance application also implemented on the STBs 105, such as an interactive television program guide, via a suitable application programming interface (the guide application is not shown to avoid over-cluttering the figure). In other embodiments, the interactive media guidance application includes switched digital video functionality.

Although in the disclosed embodiment client 107 runs on STB 105, any equipment suitable for accessing SDV may be used. For example, a personal computer with a television card and/or Open Cable Unidirectional Receiver (OCUR) (PCTV). STB 105 may be any suitable settop such as, for example, a DCT 2000, 2500, 5100, 6208 or 6412 set-top box provided by Motorola, Inc.

STB 105 may include any suitable control circuitry, display circuitry, communications circuitry, memory, etc. The control circuitry may include one or more tuners (e.g., analog or digital tuners), encoders and decoders (e.g., MPEG encoders and decoders), processors (e.g., MIPs and/or Motorola 68000 family processors), memory (e.g., RAM, ROM, flash memory, and hard disks), communications circuitry (e.g., cable modem and ATSC 256QAM receiver circuitry), input/output circuitry (e.g., graphics circuitry), and any other suitable components for providing analog or digital television programming in an SDV system.

A display device such as a television, and a remote control, may be coupled to STB 105 to display various displays and receive user inputs. The operation of control and other circuitry in a STB is well known to those skilled in the art. The control circuitry is adapted to receive user input from input device 108, execute the instructions of client 107 (using suitable microprocessors, memory, etc.), execute the instructions of any other interactive applications (e.g., an interactive television program guide), and direct the display circuitry to generate a display.

Whatever the chosen approach, client 107 detects a user channel/service change and determines whether the desired channel or service is currently allocated by examining carousel 106. A user may indicate a desire to change channels by, for example, tuning using arrow keys on a remote, entering a channel number on a remote, or using any suitable interactive media guidance function that allows the user to select a program or source. A user may indicate a desire to change services by, for example, linking to a VOD service from a television channel, or accessing a service via the interactive media guidance application. In some embodiments, carousel 106 is not used or only used under some circumstances. Typically, however, if a carousel is used, client 107 will first check the carousel when it desires to tune to a channel to see if it has already been allocated. If a channel has not already been allocated, client 107 issues a request to switched-services session manager 101 for the frequency of the QAM and program number within that QAM frequency where the channel or service may be found.

As described in more detail below, before allocating a channel, session manager 101 determines whether there is sufficient bandwidth and/or interest for the requested channel. In response to determining if sufficient interest exists, session manager 101 instructs ERM 108 to allocate bandwidth for the channel and, if necessary, to first de-allocate another channel or service to free-up the required bandwidth.

A channel-interest manager 102, which determines the interest for different channels and services, is embedded within switched-services session manager 101. Channel-interest manager 102 can work alone, or in cooperation with revenue manager 103, which assigns priority based on potential revenue of each channel or service that may be allocated or potential loss associated with each channel that may be deallocated, and trend manager 104, which considers viewer trends to determine if viewers are active. Channel-interest manager 102 may be any suitable combination of hardware and software for performing its features described herein. For example, channel-interest manager 102 may include control circuitry having include one or more processors (e.g., MIPs and/or Motorola 68000 family processors), memory (e.g., RAM, ROM, flash memory, and hard disks), communications circuitry, and any other suitable components for providing its features described herein. Trend manager 104 may be any suitable combination of hardware and software for performing the features described herein. For example, trend manager 104 may include control circuitry having include one or more processors (e.g., MIPs and/or Motorola 68000 family processors), memory (e.g., RAM, ROM, flash memory, and hard disks), communications circuitry, and any other suitable components for providing the features described herein.

When a request for a channel is made from a STB 105, the STB's local copy of the data from carousel 106 is first checked to see if that channel has already been allocated bandwidth and whether the allocated frequency and program number is stored in the carouseled channel map. If the channel map does not contain the requested channel, client 107 then sends the request to switched-services session manager 101. Session manager 101 communicates with channel-interest manager 102, which then performs the algorithms necessary to determine if a channel is to be allocated to bandwidth and if a currently allocated channel may be bumped (See FIGS. 2-8). Session manager 101 may also communicate with revenue manager 103 and trend manager 104 in a like manner and/or other external information sources that may aid in the decision.

Switched-services session manager 101 then tells ERM 108 that an unallocated channel 111 should be allocated to available bandwidth (either already available or available after bumping another channel). ERM 108 communicates with edge device 110 to first deallocate any bumped channels, (or alternatively degrade HD channels to SD, or take other measures to free bandwidth, including changing the partition of QAMs between service types, e.g., VOD and SDV), and allocate the new channels to edge device 110. During the new allocation, the new channel is then linked from the network to the newly allocated QAM program number. For example, in some embodiments, network 109 is a gigabit Ethernet network and edge device 110 is linked to network 109 via a switch. When edge device 110 wants to connect to a service that is carried over IP on the gigabit network 109, it registers a multicast join with the switch. Edge device 110 communicates the frequency for the new channel to ERM 108, which in turn provides this information to session manager 101, which updates the channel map in carousel 106. Edge device 110 modulates the requested channel on the allocated frequency and program number where it is ultimately received by STB 105. STB 105 receives the new frequency for the channel by checking the channel map in carousel 106 or via direct response to a channel tune request via session manager 101 and tunes to the frequency/program number to watch the program.

In some embodiments, the Emergency Alert System (EAS) channel is provided using SDV. When a STB receives an EAS alert, channel-interest manager 102 (FIG. 1) receives numerous requests such that the interest quickly exceeds a interest threshold set for channel allocation. The EAS channel is thus allocated to bandwidth that is ordinarily free for other channels absent an emergency. In some embodiments, the EAS channel information may be included in carousel data feed 106 with a time to live of infinity (as a special mechanism only used for EAS) so that it persists in the carousel feed but on a hidden channel that is not tunable directly by a user. Special provision is made for the EAS channel such that unlike other switched channels in the carousel, it is never really allocated to the bandwidth until the interest threshold is met even though it is shown as active in the carousel so that the clients 107 of STBs 105 may quickly determine where to direct the STB's to tune without having to request the channel from the server. In response to the EAS alert, ERM 108 directs Edge device 110 to switch in the channel for the EAS (not shown) to the designated QAM frequency and program number. Clients 107 respond to the alert by examining the carousel and directing STBs 105 to tune to the indicated QAM frequency and program number.

In other embodiments, STB requests for EAS channel are preceded with a random backoff and the first STB's request for the EAS channel that gets through the session manager causes ERM 108 to allocate the EAS channel. The session manager 101 in turn updates the channel map in the carousel to reflect the EAS channel as active. Once the frequency and program number assigned to the EAS channel is stored on the carousel as, subsequent pending tune requests for the EAS channel will be managed locally by the STB via look up of the frequency and program number for the EAS channel directly from the cached carousel. This results in reduction of upstream traffic that would otherwise result from a large number of STBs concurrently requesting the same channel.

Figure 2:
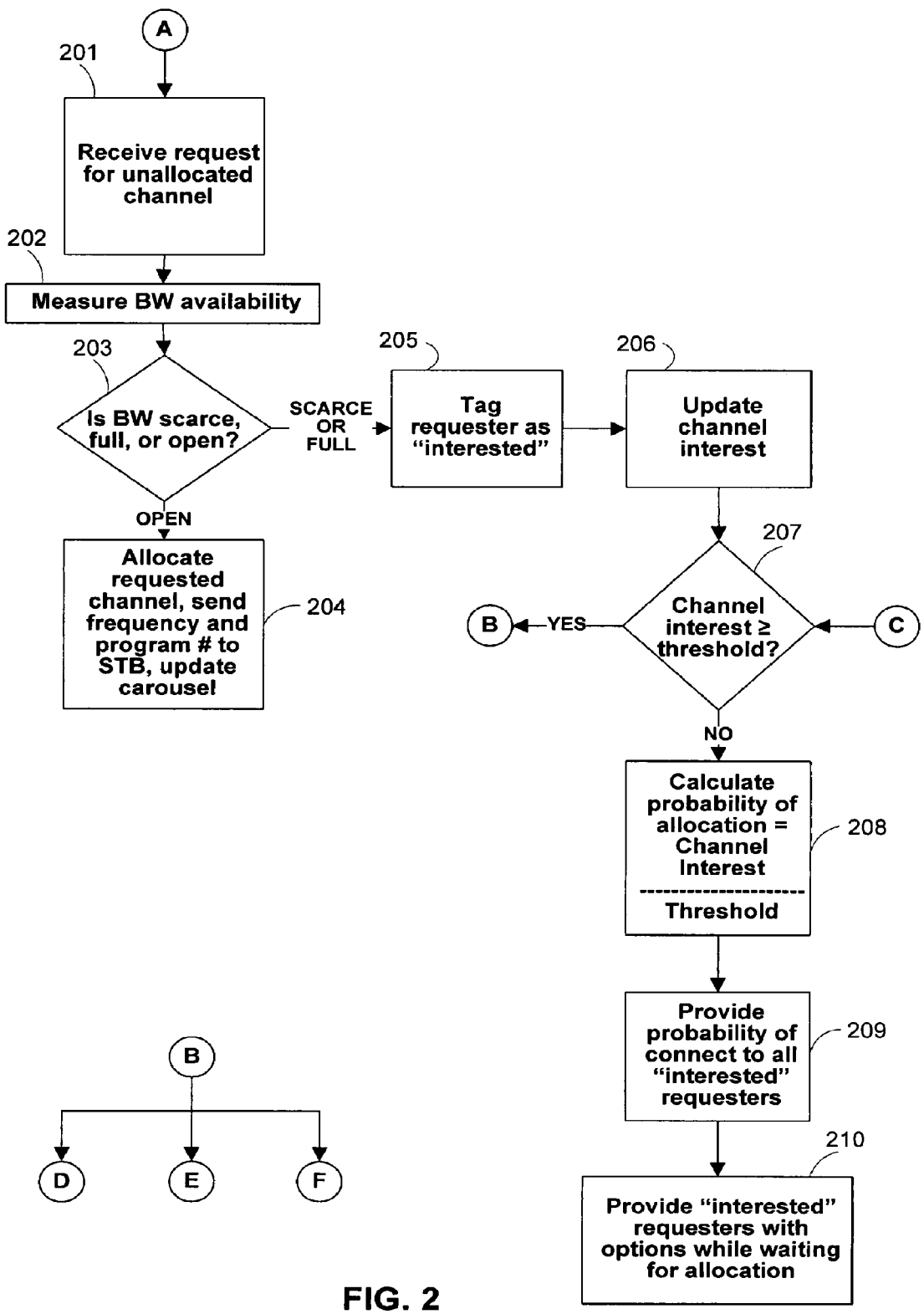
FIG. 2 is a flow chart of an illustrative method for allocating bandwidth after first considering interest in accordance with one embodiment of the present invention.

FIG. 2 shows an illustrative method for allocating bandwidth based on interest in accordance with one embodiment of the present invention. The method in FIG. 2 is carried out by channel-interest manager 102 shown in FIG. 1. Channel-interest manager 102 (FIG. 1) keeps a dynamic channel interest calculation that is updated (step 206) when an unallocated channel is requested from STB 105 (FIG. 1). Channel interest may include many different request types to help it prioritize which channels will ultimately be allocated. Some exemplary request types are parking-based requests and voting-based requests, such as recording-based requests and reminder-based requests. In some embodiments, the various request types may be "weighted" using any suitable weighting algorithm. The weighting algorithm may be used in calculating the channel interest according to step 206. For example, parking-based requests may be weighted more heavily than voting-based requests, and, even among votes, recording-based requests may be weighted more heavily than reminders. In some embodiments, the algorithm for determining interest in the channel includes a weighted sum of these requests.

When a user attempts to tune to a channel that is presently unallocated and the user "parks" (i.e., does not tune away from) on the channel in anticipation of eventual interest-dependent allocation, this is classified as a parking request. Such a request may or may not be explicitly understood to the user as "parking." For example, in some embodiments, when a user attempts to tune to a switched channel, the user may be presented with a "one moment please" (OMP) message while the system determines whether or not to allocate the channel based on interest measured, in one case, within a specified window of time. If this window of time is small enough (e.g., less than six seconds) and the decision to allocate the channel is made relatively quickly, the OMP will be removed, the STB will tune to the newly allocated channel, and there may be no explicit indication to the user that any parking and/or allocation decision was going on behind the scenes. If, however, the decision is made to not allocate the channel, or if the decision will take longer, in some embodiments, various degrees of feedback may be provided to the user relating this information to them. This feedback may be in the form of a text message (e.g., "The requested channel is presently unavailable.") or a graphic (e.g., a bar graph showing interest relative to threshold) or combinations of the two. Typically, when a user "parks" on a channel, they are executing a persistent request to watch a program which has just substantially started or is in progress. In some embodiments, a distinction is provided between requesting a channel and requesting a program on that channel.

Alternatively, though similarly, a user may choose to "vote" for a channel or a program on a channel. In voting-based requesting, a user may vote concurrently for one or more channels (or programs) he may wish to watch. In some cases, parking can be seen as a special case of voting. When voting, a user may vote for multiple different channels or programs to be allocated, in some situations, specifying relative priority. In some embodiments, the priority may be considered in the weighting algorithm used to calculate channel interest.

A user may also vote by recording a channel or program on a channel or by setting a reminder for a program on a channel. In some embodiments, recording-based requests and reminder-based requests may be weighted as less than a full request since the requester may ultimately decide not to watch the channel.

Referring to FIG. 2, in step 201, session manager 101 (FIG. 1) receives a request for a presently unallocated channel from a STB. Channel-interest manager 102 receives a request from client 107 (FIG. 1) by any of the methods discussed above ("parking" on a presently unallocated channel in anticipation of it being allocated or "voting" for a channel).

Once a request is received (step 201), session manager 101 (FIG. 1) communicates with ERM 108 (FIG. 1) to measure the amount of available bandwidth (step 202) and then classifies the bandwidth as open, scarce, or full (step 203). A classification of open signifies that there is ample space on the bandwidth to allocate a substantial number of new requests, scarce signifies that only a limited amount of space remains, and full signifies that no space remains. These classifications may be based on any threshold amount of space that the ERM programmer determines appropriate. When the bandwidth is open, the requested channel is allocated (step 204). If the bandwidth is scarce or full, session manager 101 logs the originator (STB) of the request, tags that requestor as "interested" (step 205), and updates the channel interest for that channel (step 206).

Next, channel-interest manager 102 (FIG. 1) compares the interest and the interest threshold (step 207). While the interest remains lower than the threshold, channel-interest manager 102 (FIG. 1) calculates the probability of allocation (step 208) and then sends that probability to client 107 (FIG. 1) previously marked "interested" (step 209). The client 107 (FIG. 1) then gives the requester options while waiting for allocation (step 210) (e.g., FIG. 3). Once the interest for an unallocated channel exceeds the interest threshold, the channel is allocated subject to whether there is another channel that can be bumped based on low relative channel interest (e.g., FIGS. 5 and 6) or whether the channel has lower quality version available (e.g., SD version rather than HD version as shown in FIG. 7). These conditions will be discussed in greater detail in FIGS. 5-7.

Figure 3:
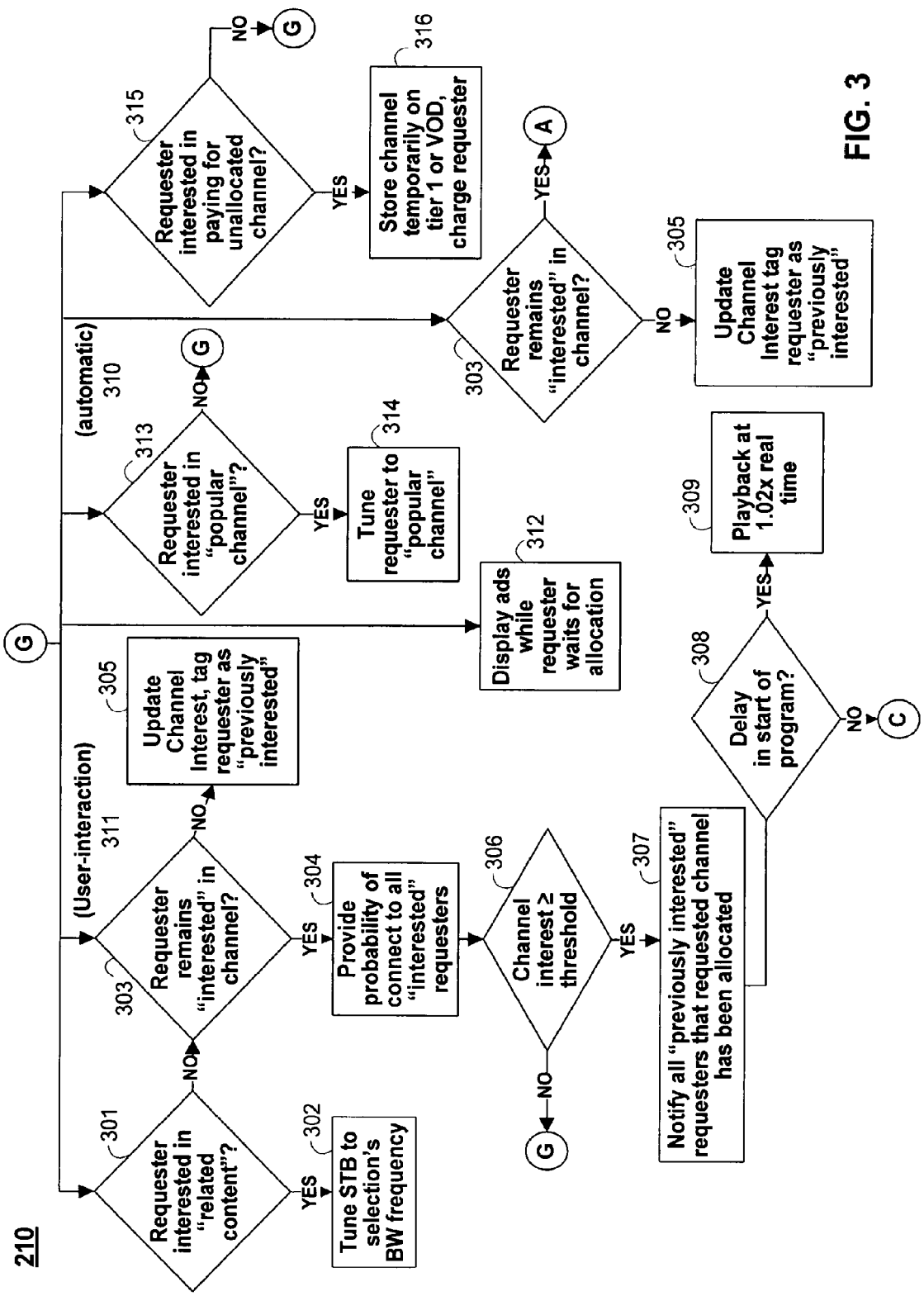
FIG. 3 is a flow chart of an illustrative method for providing options to a requester when a channel is not available in accordance with one embodiment of the present invention.

FIG. 3 shows an illustrative method for providing a requester options when a channel is not available in accordance with one embodiment of the present invention. When a channel is not available (or made available), client 107 (FIG. 1) simultaneously gives the requester a number of options (FIG. 2, step 210). In one option, the requester may choose to watch "related content" (step 301). If this option is chosen, client 107 (FIG. 1) retrieves an allocated channel frequency from carousel 106 (FIG. 1) with similar content as the channel requested and sends it to client 107 (FIG. 1) so that STB 105 (FIG. 1) may tune to that channel (step 302). Session manager 101 (FIG. 1) may classify channels as related based on any suitable method. For example, session manager 101 may classify all channels with common titles as related (e.g., "Intro to Pilates" and "Pilates for Healthy Living" would be classified as related channels based on the common word "Pilates" in the title).

Another option allows the requester to remain "parked" on the requested channel (step 303) while channel-interest manager 102 (FIG. 1) continuously updates the probability of allocation as the requester waits (i.e., "parks") (step 304). Channel-interest manager 102 (FIG. 1) updates the channel interest as additional requests are made for the same channel and recalculates the likelihood of allocation feedback, which is dynamically available to the waiting requester. Alternatively, if the requester tunes away, channel-interest manager 102 (FIG. 1) decrements the counter (those not actively waiting are not included in the channel interest calculation) and tags the requester as "previously interested" (step 305). Once the channel interest exceeds the interest threshold (step 306), the "previously interested" requesters are notified (step 307) by session manager 101 (FIG. 1) sending a message to those STB clients 105 (FIG. 1).

In some embodiments, the channel-interest manager 102 (FIG. 1) may be aware of program boundaries on switched channels. With this information, the channel-interest manager 102 (FIG. 1) may determine that voting or parking by users on a channel at a particular timeframe represents interest in the content that is scheduled for that channel at the given timeframe (e.g., the start of the program). Delays may occur in the allocation of the channel as a result of the voting and/or parking interest for the channel remaining below the threshold for the allocation of the channel. These delays might normally result in the users missing the beginning of the programming on the channel. However, in some embodiments, when the channel interest manager detects that the channel interest for a channel may actually be a channel interest for a program beginning on that channel at a particular time but that the allocation may involve delays beyond that particular timeframe, it may buffer the channel for the users. Such buffering may be accomplished by the channel-interest manager 102 (FIG. 1) routing the channel content to a channel buffering subsystem until such time as the channel becomes available. Upon allocation of the channel, users may then be presented with the options of (a) joining the program in progress and missing the beginning or (b) watching the program from the beginning (e.g., similar to a start-over function). In the latter case, if the program is watched in real time, it's viewing may run beyond the beginning of the next program scheduled on this or another channel and this may be undesirable to the user. Therefore, in some embodiments, an option of watching the program in faster than real time is provided, or alternatively an option of skipping through some portions of the program may be enabled.

Returning to FIG. 3, any delay in the start of the program while waiting for allocation (step 308) may be remedied by playing the channel at a faster speed (e.g., 1.02× real time playback) (step 309). This option may be implemented automatically (step 310) or by user-interaction (step 311) as explained above For example, a caching server (e.g., a server with suitable tuners, decoders, and storage to cache unallocated channels) may be coupled to the network 108 of FIG. 1. The caching server may detect and cache the unallocated channels. When a previously unallocated channel is switched in, edge resource manager 108 (FIG. 1) may direct edge device 110 to include the stream from the cache server for the channel, instead of the stream from the actual source of the video. The fast-playback (and other trick play functions, may be provided by the server or, alternatively, handled in local cache by the client 107. As an alternative embodiment of this option (not shown in diagram), channel-interest manager 102 (FIG. 1) can include the "previously interested" viewers in its channel interest calculation; thus, decrementing the count in step 306 would not be necessary.

The requester may also have the option of watching displayed advertisements or other alternative content while waiting for allocation (step 312). The alternative content may be retrieved by client 107 (FIG. 1) from storage on STB 105 (FIG. 1). Alternatively, switched-services session manager 101 (FIG. 1) may offer the content directly (e.g., from local storage) or indirectly by directing edge resource manager 108 to switch in alternative content from a source coupled to network 108 (FIG. 1), and update the carousel. Switched-service session manager 101 (FIG. 1) will then alert client 107 (FIG. 1) to the presence of the alternative content. In response to the alert, client 107 (FIG. 1) will check the carousel and, based on a flag in the carousel or an indicator from the alert, select the alternative content.

Another option allows the requester to watch the most popular channel at that moment in time (step 313). If the requester is interested in this option, channel-interest manager 102 (FIG. 1) the channel with the highest interest, measured by the counter, to client 107 (FIG. 1) along with its corresponding frequency retrieved from carousel 106 (FIG. 1) (step 314). Client 107 may search the carousel for the most popular channel and display it for the user (e.g., by controlling a tuner in STB 105 (FIG. 1)).

A final option embodied in FIG. 3 gives the requester a choice to pay for an unallocated channel, rather than wait for possible allocation (step 315). When this option is selected, the channel may be temporarily provided as VOD or as tier 1 SDV and the requester is charged (step 316). For example, in some embodiments, a certain amount of bandwidth is reserved for premium or pay services that is not available in the general pool of bandwidth available for basic switched services. If a user wishes to pay for access to this reserved bandwidth, the service that he parked on or voted for is switched into this reserved bandwidth, the user is charged, and his settop is provided the information that will allow it to tune to the newly allocated channel. Note that this channel may optionally be encrypted and that typically this channel is not added to the active channel list in the carousel, since that would allow other users to access it as well. However, in some embodiments (which emulate the bar jukebox model where one patron's nickel provides music for the entire place), the channel may be paid for by one user and then made available to others users for free or for a reduced rate that may be a function of the number of paying users. In one variant, additional paying users may result in discounts to the first paying user.

VOD allocation for pay is managed similarly. Though a channel may not be allocated to the general pool of resources for free, it may be buffered to a subsystem such as a VOD server. If a user then wishes to pay for the service, it may be spooled directly from the VOD server in the manner it is typically done. In such cases, the user may or may not be given trick play options on the service.

In some embodiments, such bandwidth allocation and reservation for premium services is managed by revenue manager 103 working in conjunction with channel-interest manager 102 in switched-services session manager 101 of FIG. 1. Revenue manager 103 may be any suitable combination of hardware and software for performing its features described herein. For example, revenue manager 103 may include control circuitry having include one or more processors (e.g., MIPs and/or Motorola 68000 family processors), memory (e.g., RAM, ROM, flash memory, and hard disks), communications circuitry, and any other suitable components for providing its features described herein.

In some embodiments, channels of the SDV system are assigned to tiers. For example, there may be a SDV premium tier and discount tiers 1, 2, 3, etc. Lower tiers may, for example, be associated with a larger tune delay (all the way to not available) and lower probability of being allocated. Channels may be assigned to higher or lower tiers based on observed or predicted interest, or the expected "take" or profitability of the channel. Each tier may have a certain number of reserved QAMs. In this way, more popular or higher tier channels have a higher probability of being allocated to the QAM and a lower tuning delay. For example, some channels in "Tier 1" may have a guaranteed allocation.

Figure 4:
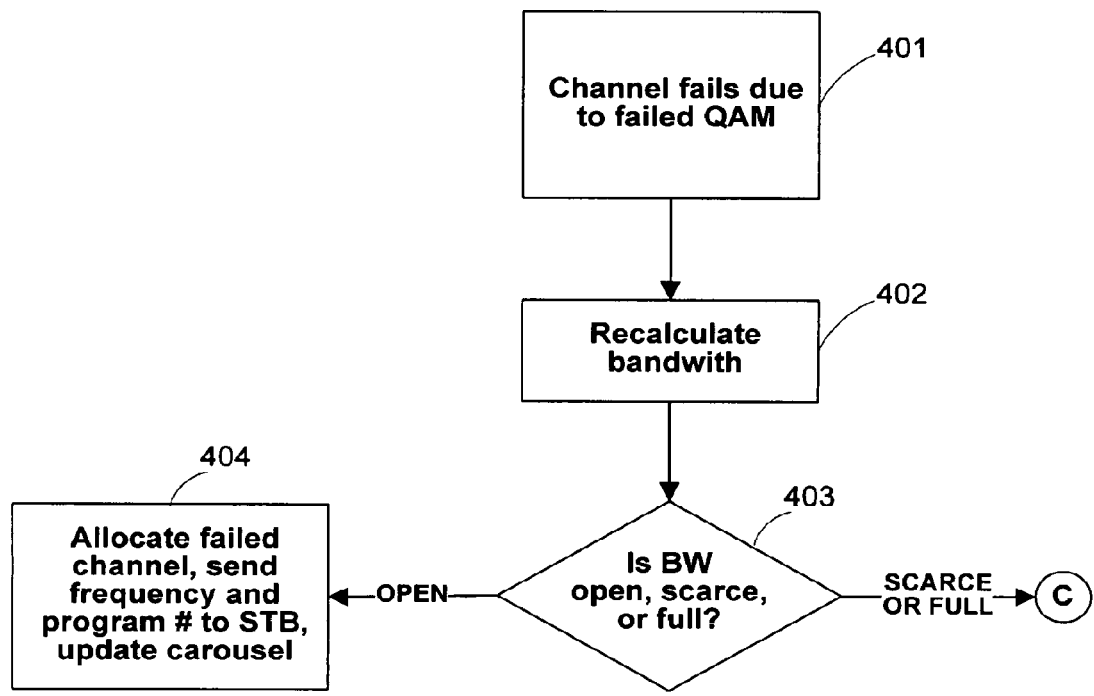
FIG. 4 is a flow chart of an illustrative method for allocating bandwidth based on interest when a currently-allocated channel fails due to failed QAM in accordance with one embodiment of the present invention.

FIG. 4 shows an illustrative method for allocating bandwidth based on interest when a currently-allocated channel fails due to failed QAM in accordance with one embodiment of the present invention. When a channel fails due to a QAM failure (step 401), session manager 101 (FIG. 1) communicates with ERM 108 (FIG. 1) to measure the amount of available bandwidth (step 402) and then classifies the bandwidth as open, scarce, or full (step 403). If the bandwidth is full, the interest for the failed QAM is considered by channel-interest manager 102 (FIG. 1) (step 402) A classification of open signifies that there is ample space on the bandwidth to allocate a substantial number of new requests, scarce signifies that only a limited amount of space remains, and full signifies that no space remains. These classifications may be based on any threshold amount of space that the ERM programmer determines appropriate. When the bandwidth is open, the failed channel is reallocated (step 404). If the bandwidth is scarce or full, channel-interest manager 102 (FIG. 1) compares the channel interest and the interest threshold (FIG. 2, step 207) and treats the failed channel as a requested channel as in FIG. 2 (see FIG. 2, steps 207-210).

Figure 5:
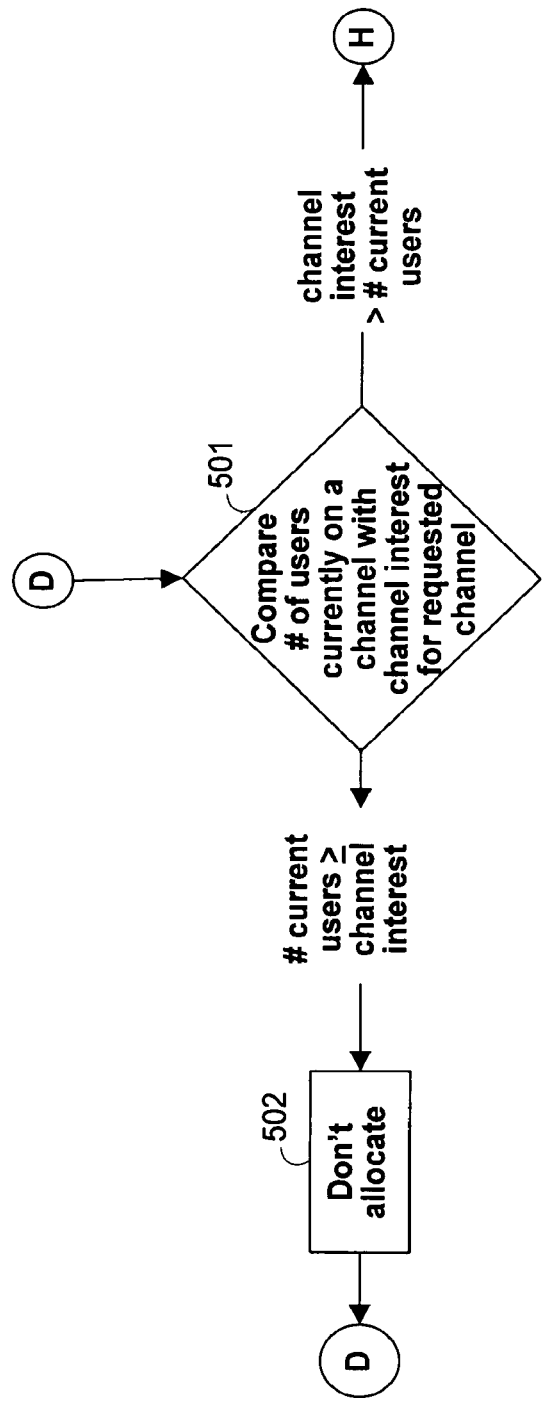
FIG. 5 is a flow chart of an illustrative method for de-allocating a relatively less requested channel in accordance with one embodiment of the present invention.

FIG. 5 shows an illustrative method for de-allocating a relatively less requested channel in accordance with one embodiment of the present invention. Channel-interest manager 102 (FIG. 1) compares the number of users on currently allocated channels with the channel interest for a requested channel (step 501). While the channel interest for a requested channel remains lower than the current number of users on a current channel, ERM 108 (FIG. 1) does not allocate the requested channel to QAM 110 (FIG. 1) (step 502) and channel-interest manager 102 (FIG. 1) continues the comparison (step 501). Once the interest for an unallocated channel exceeds the number of users for any allocated channel, session manager 101 (FIG. 1) considers de-allocating that allocated channel as depicted in FIG. 6.

Figure 6:
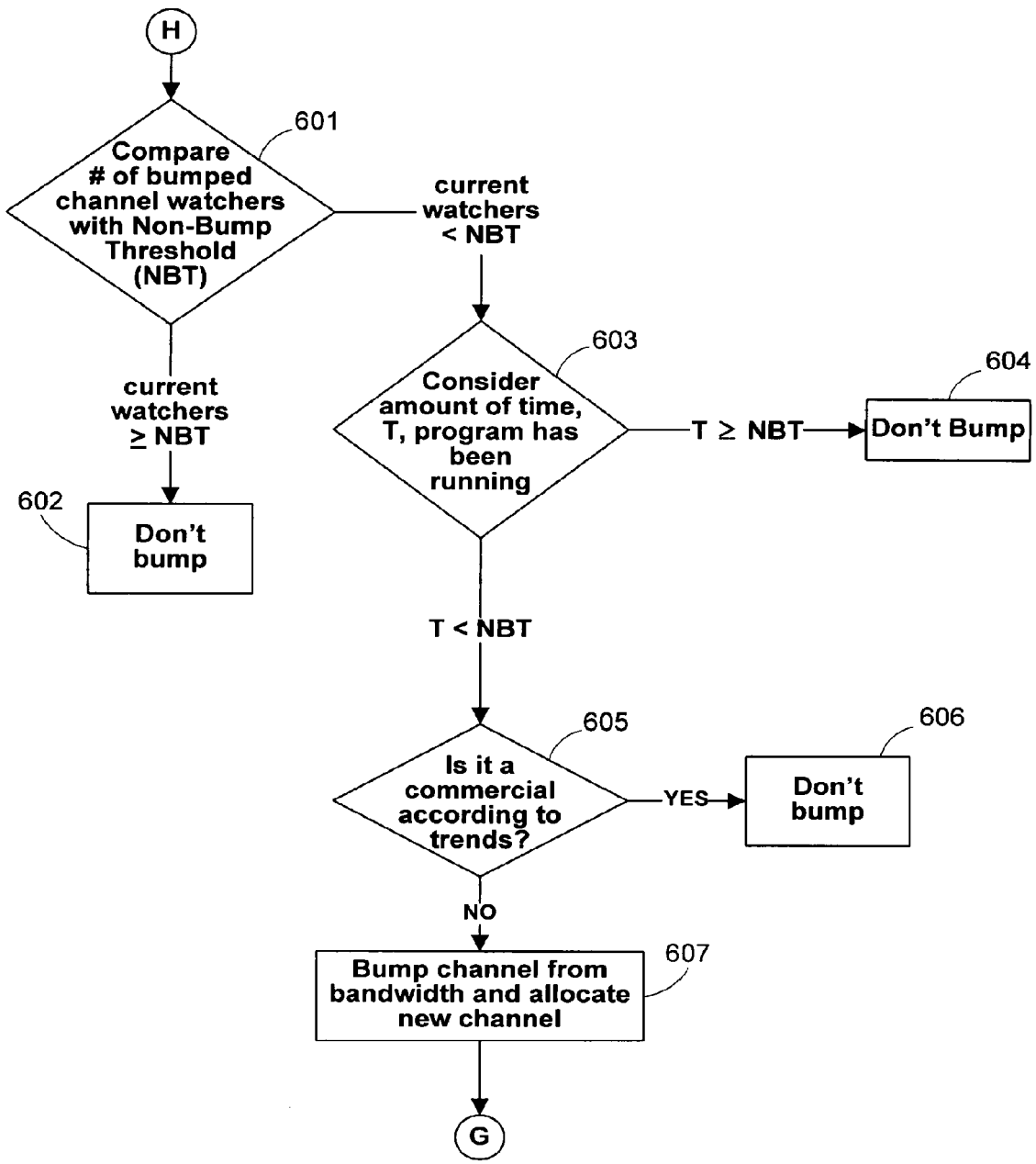
FIG. 6 is a flow chart of an illustrative method for considering parameters before de-allocating a channel in accordance with one embodiment of the present invention.
Figure 7:
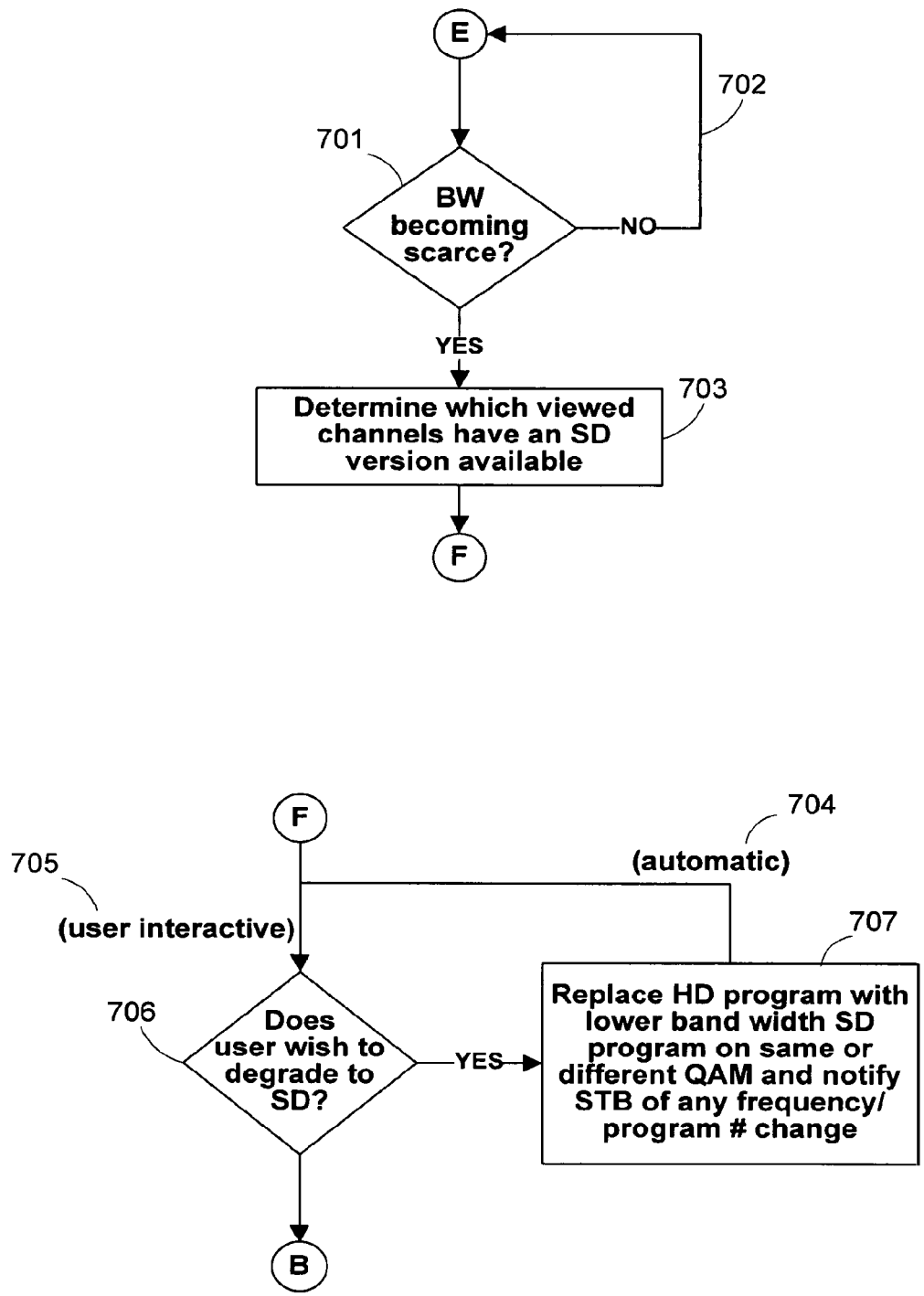
FIG. 7 is a flow chart of an illustrative method for degrading channels when bandwidth is becoming scarce in accordance with one embodiment of the present invention.

FIG. 6 shows an illustrative method for considering various parameters before de-allocating a channel in accordance with one embodiment of the present invention. Channel-interest manager 102 (FIG. 1) compares the number viewers of a channel selected for de-allocation with a non-bump threshold (NBT) (step 601). While the number of viewers remains lower than the NBT, session manager 101 (FIG. 1) instructs ERM 108 (FIG. 1) not to de-allocate that channel from QAM 110 (FIG. 1) (step 602). Once the number of viewers exceeds the NBT, session manager 101 (FIG. 1) may instruct ERM 108 (FIG. 1) to de-allocate that channel based on the amount of time that the allocated channel has been running (step 603). While the amount of running time remains lower than the NBT, session manager 101 (FIG. 1) does not instruct ERM 108 (FIG. 1) to de-allocate that channel from QAM 110 (FIG. 1) (step 604). If, in the alternative, the running time exceeds the NBT, session manager 101 (FIG. 1) may communicate with trend manager 104 (FIG. 1), which stores viewer trends (step 605). Viewer trends may include any appropriate external viewer or program information (e.g., the program is being interrupted by a commercial).

For example, the session manager 101 (FIG. 1) does not instruct ERM 108 (FIG. 1) to de-allocate that channel from QAM 110 (FIG. 1) (step 606) if trend manager 104 (FIG. 1) returns that the inactivity is due to a commercial and not lack of interest. However, if trend manager 104 (FIG. 1) returns that the interest-level for the allocated channel has declined, sessions manager 101 (FIG. 1) instructs ERM 108 (FIG. 1) to de-allocate that channel from QAM 110 (FIG. 1) and to allocate the requested channel 111 (FIG. 1) in its place (step 607). The bumped user is then given new viewing options including: watch as pay-per-view, watch related content, watch content of interest, wait for re-allocation, etc. (See FIG. 3).

FIG. 7 shows an illustrative method for degrading channels when bandwidth is becoming scarce in accordance with one embodiment of the present invention. ERM 108 (FIG. 1) is continuously checking edge device 110 (FIG. 1) to determine if the bandwidth is becoming scarce (step 701). While the bandwidth remains open, ERM 108 (FIG. 1) continues measuring the availability of the bandwidth (step 702). Once the bandwidth becomes scarce, ERM 108 (FIG. 1) checks the network 109 (FIG. 1) to see if the allocated channel has a lower quality version that is currently unallocated 111 (FIG. 1) (e.g., SD rather than HD) (step 703). If a lower quality version is available, the channel is degraded either automatically (step 704) or by user-interaction (step 705). If the degrading is done automatically or if the viewer chooses de-allocation (step 706), ERM 108 (FIG. 1) replaces the higher quality version of the channel with the lower quality version of the channel at the same QAM (now with more room) (step 707), by commanding edge device 110 (FIG. 1) to allocate bandwidth to the source of the degraded version of the channel.

Figure 8:
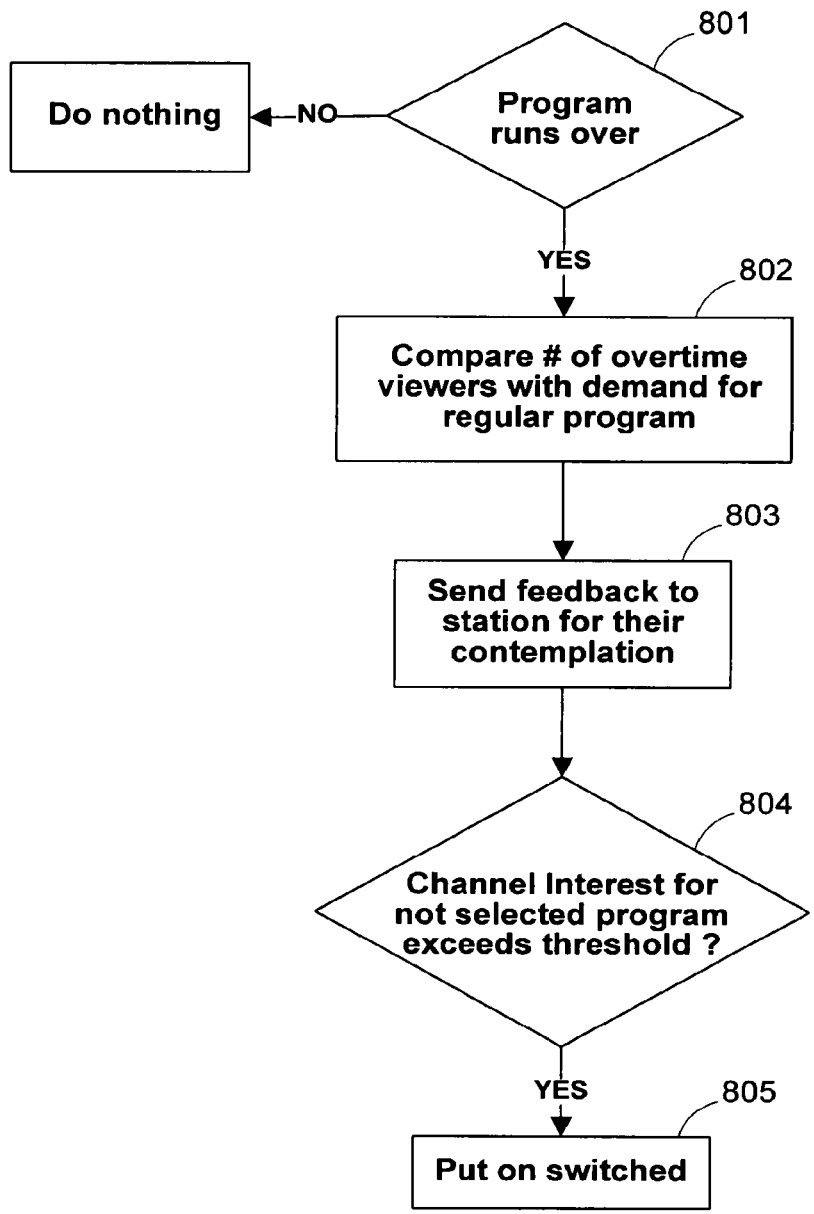
FIG. 8 is a flow chart of an illustrative method for detecting allocated program overruns and providing options based on interest in accordance with one embodiment of the present invention.

FIG. 8 shows an illustrative method for detecting allocated program overruns and providing options based on interest in accordance with one embodiment of the present invention. If a program runs over (step 801), channel-interest manager 102 (FIG. 1) compares the interest for the overtime and the interest for the regularly scheduled program (step 802). ERM/server 108 (FIG. 1) then sends the comparison over the network to the cable service provider (step 803). The cable service provider is given the option, then, of which program to put on their regularly broadcast QAM—overtime or regular program. If the program not selected by the station programmer exceeds the interest threshold (step 804), that program can be put on SDV (step 805) so that both programs may be viewed simultaneously—one on the regularly broadcast channel and the other as an SDV channel.

Figure 9A:
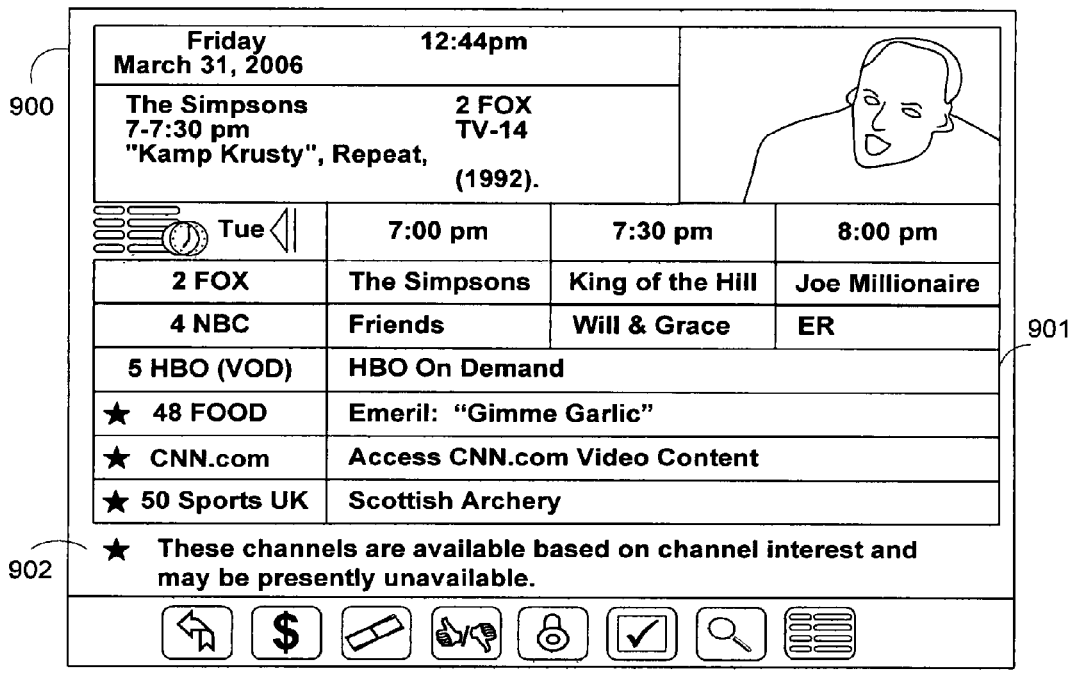
FIGS. 9A-9P show illustrative interactive media guidance application menu display screens in accordance with various embodiments of the present invention.
Figure 9B:
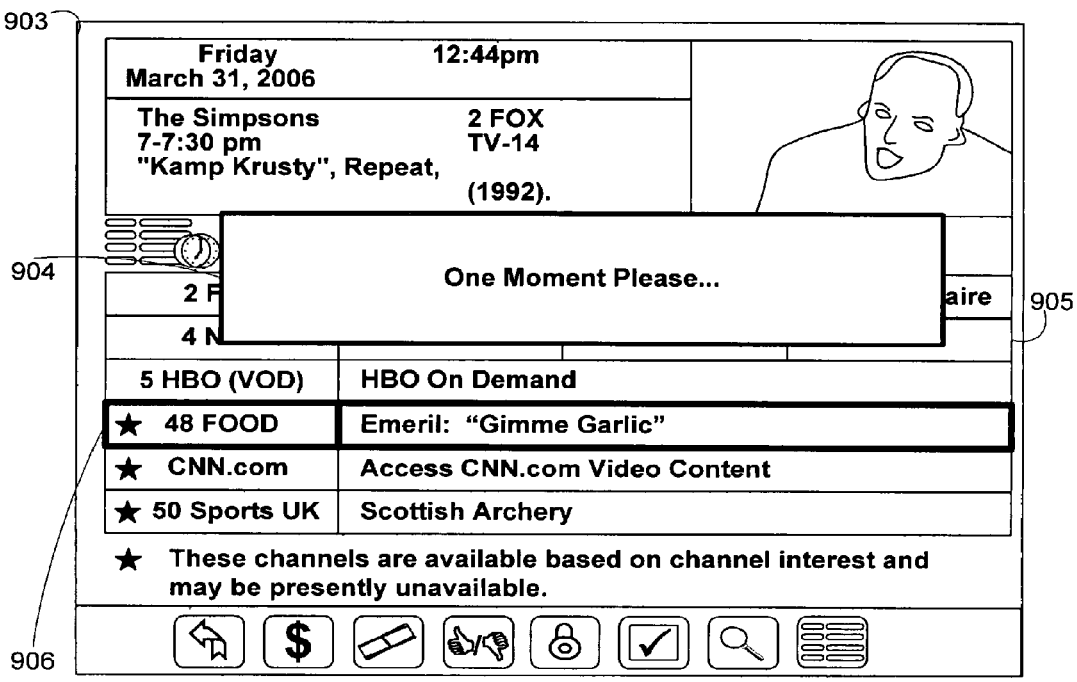
Figure 9C:
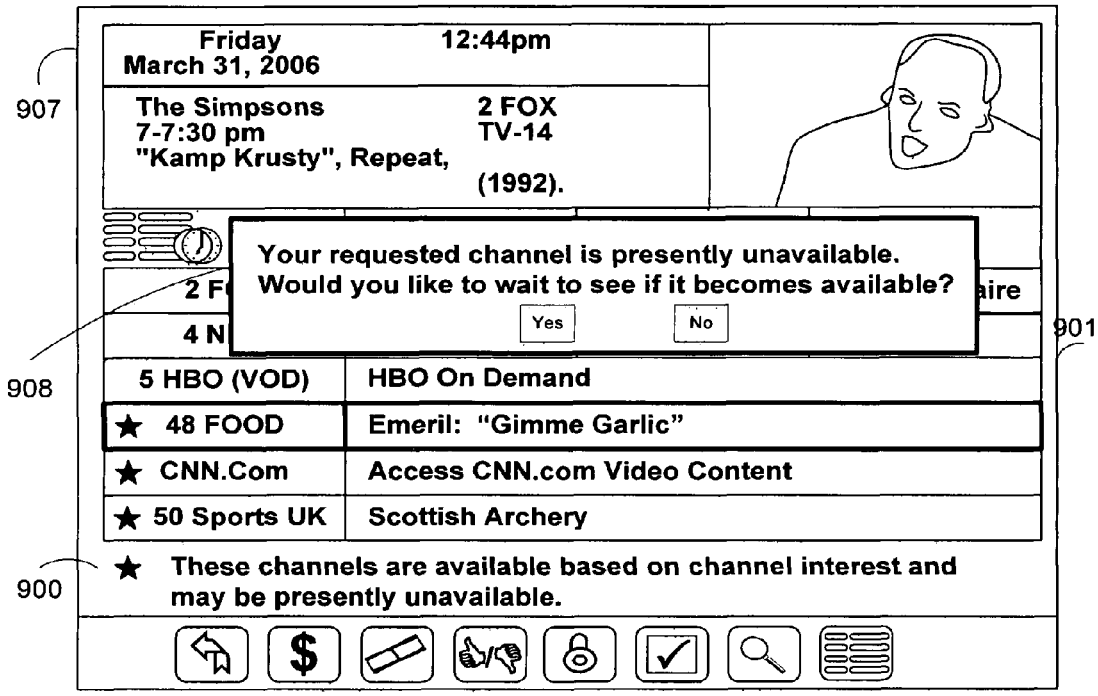
Figure 9D:
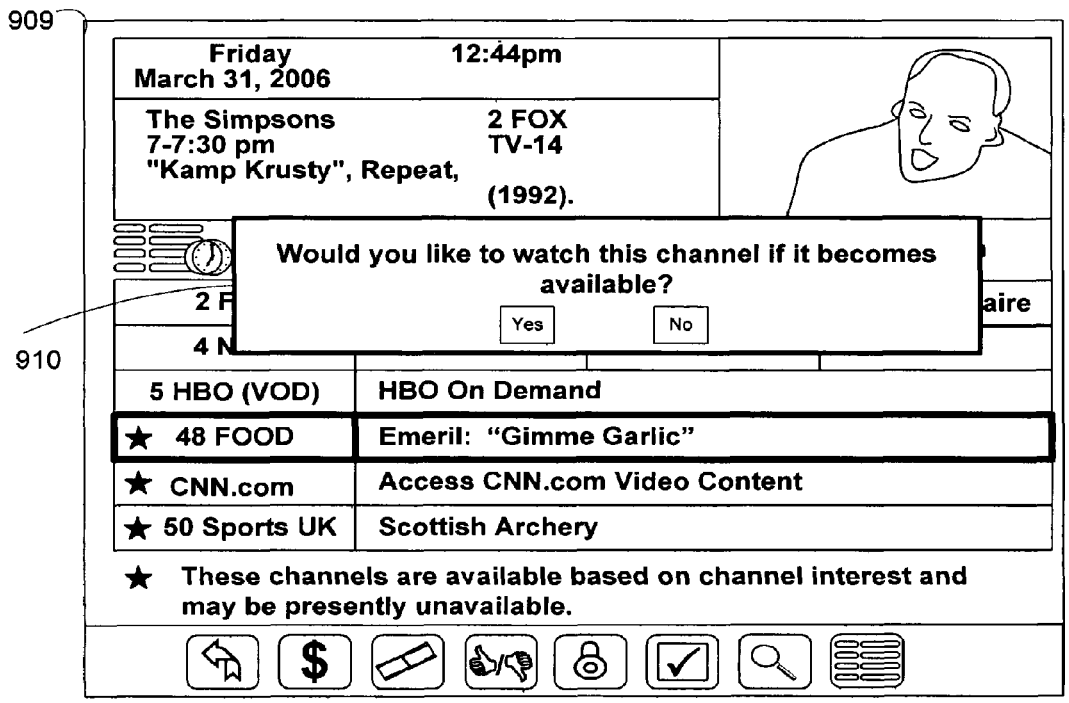
Figure 9E:
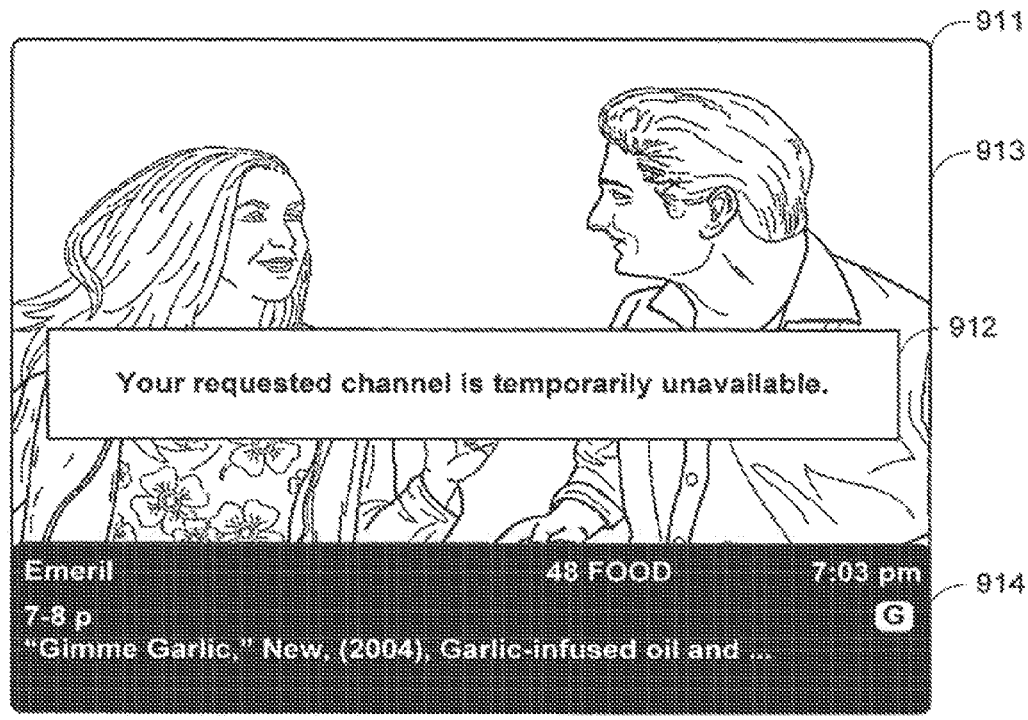
Figure 9F:
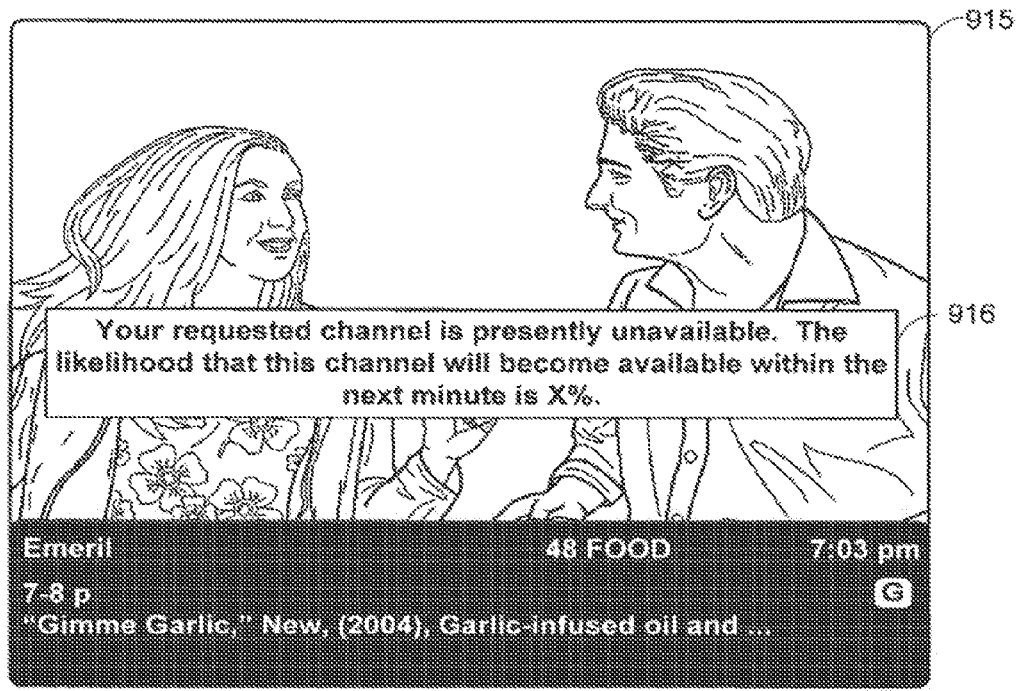
Figure 9G:
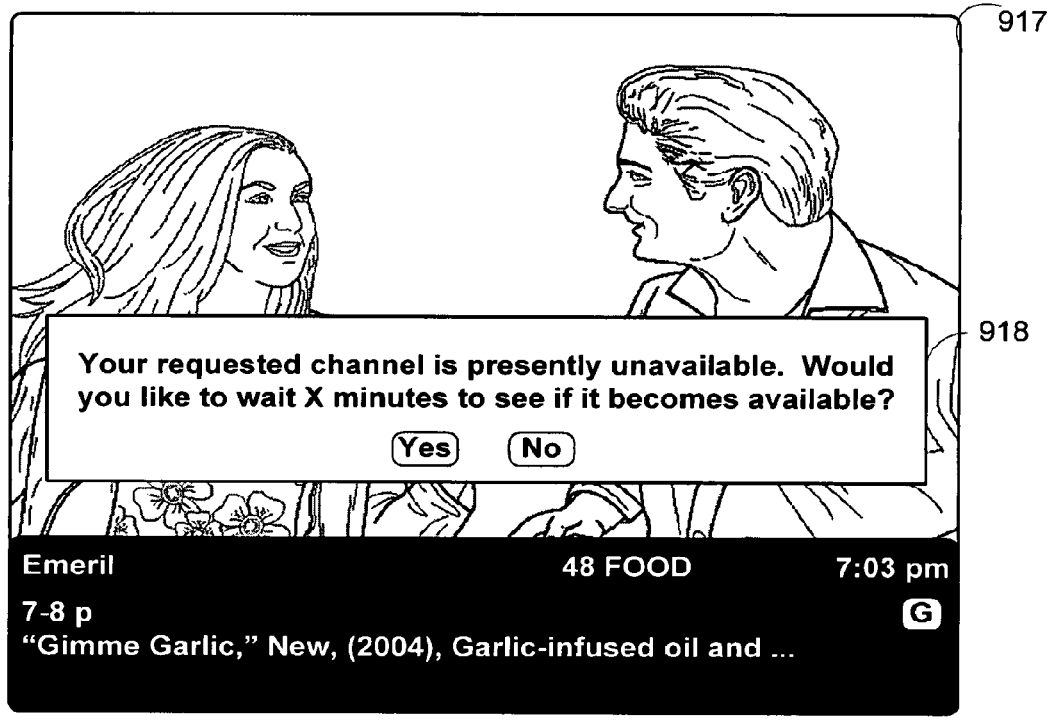
Figure 9H:
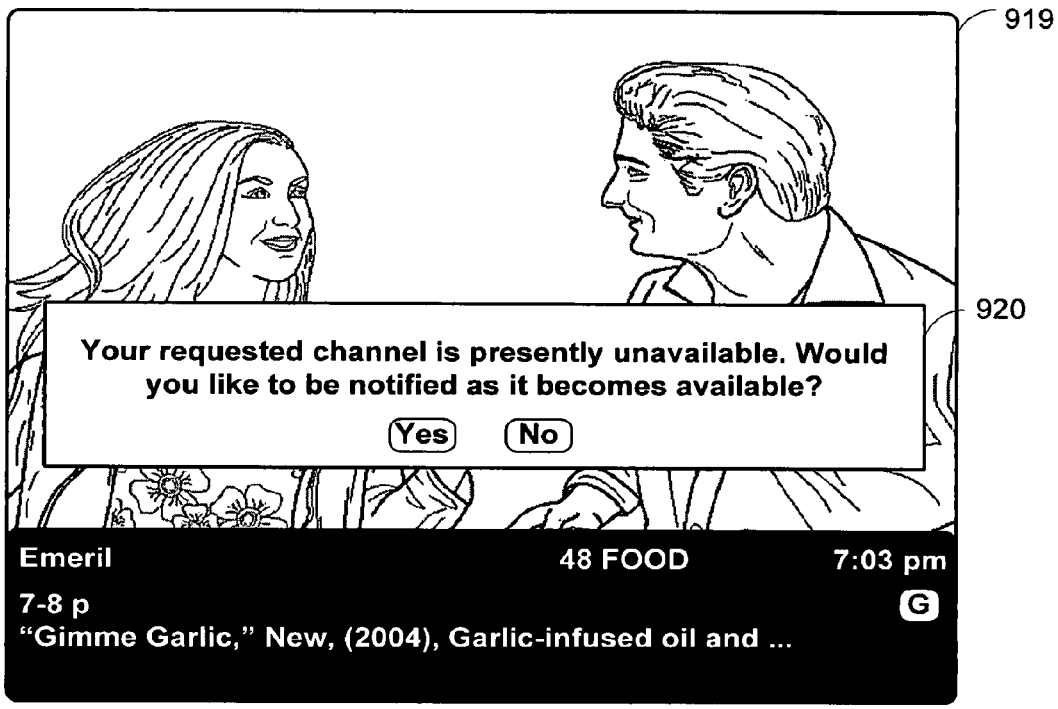
Figure 9I:
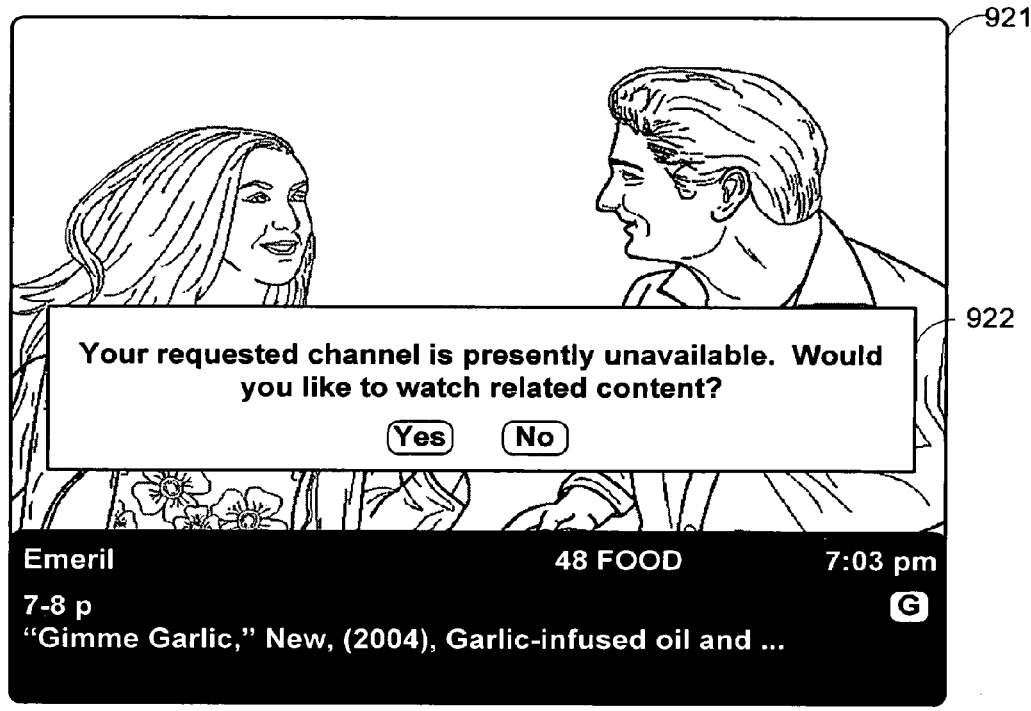
Figure 9J:
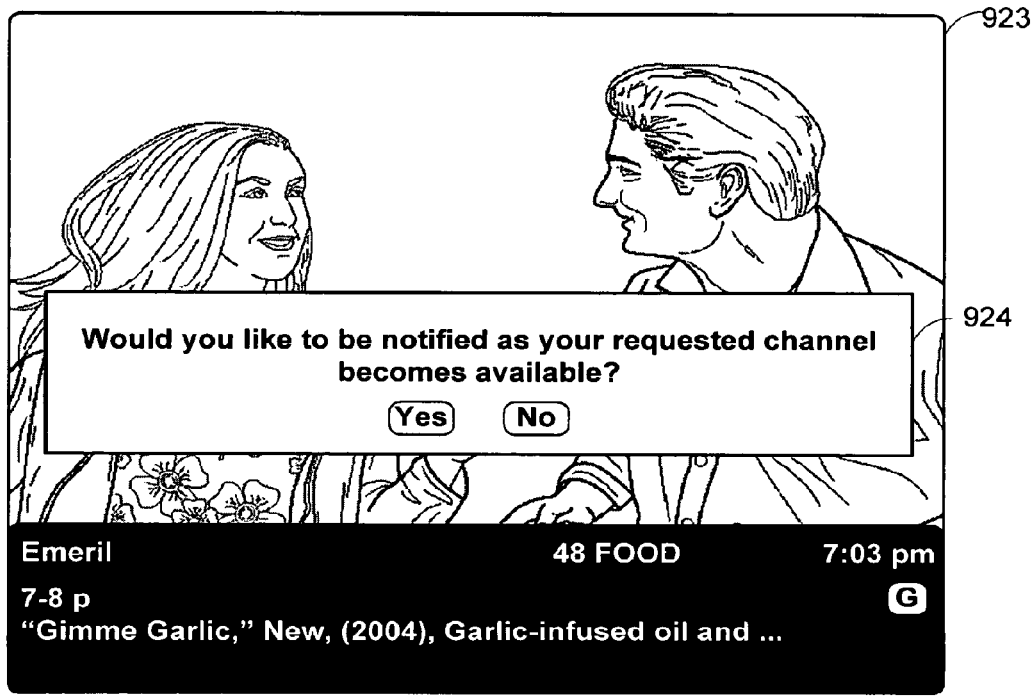
Figure 9K:
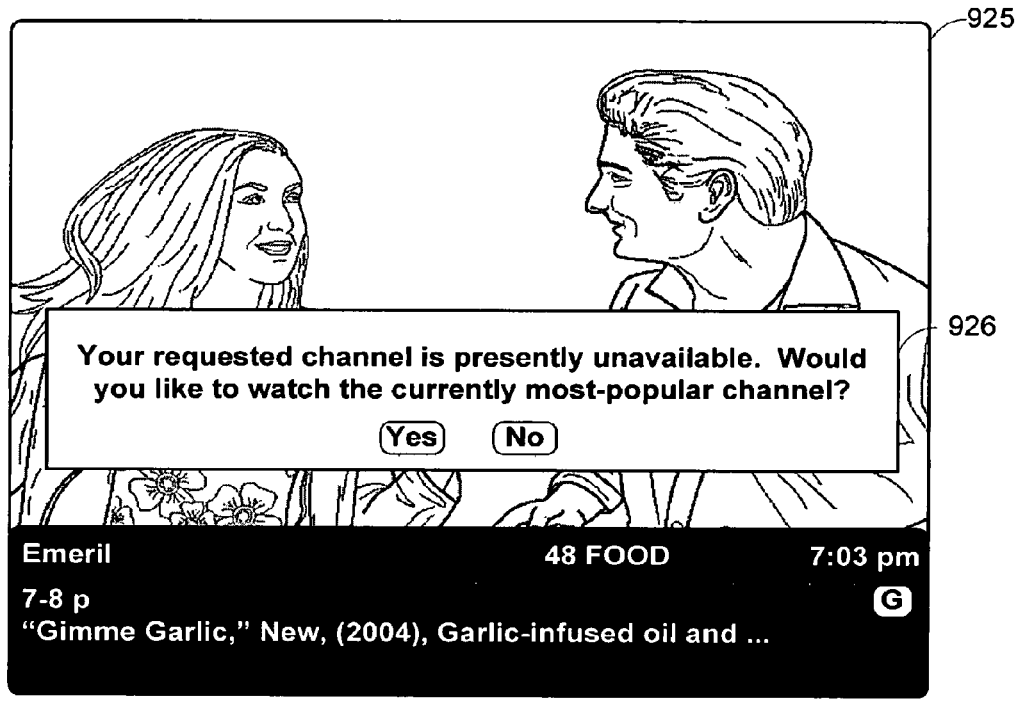
Figure 9L:
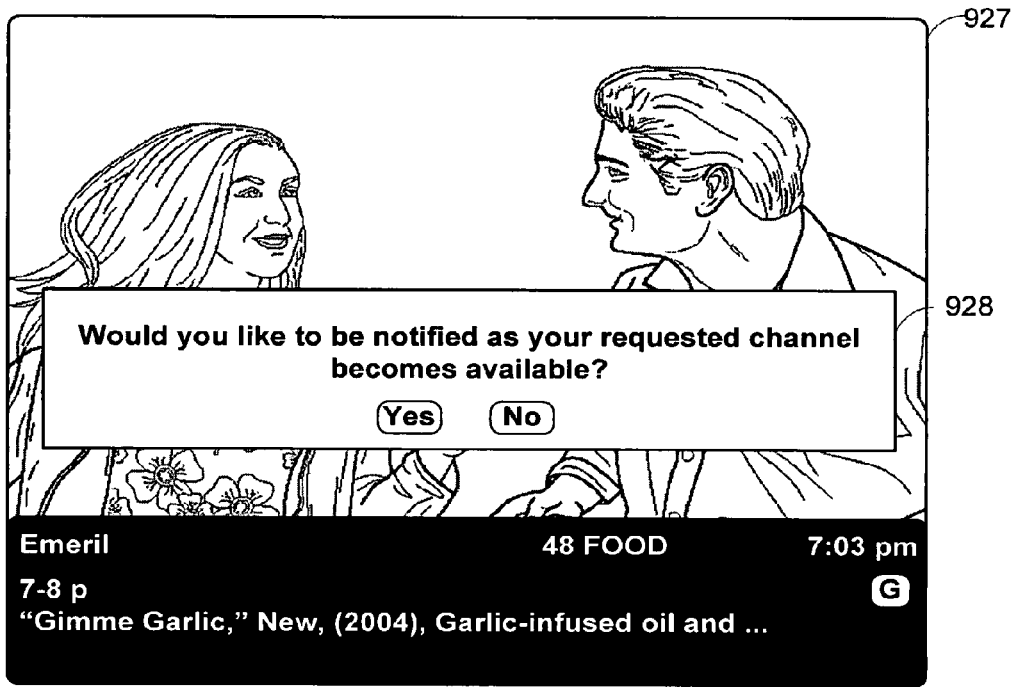
Figure 9M:
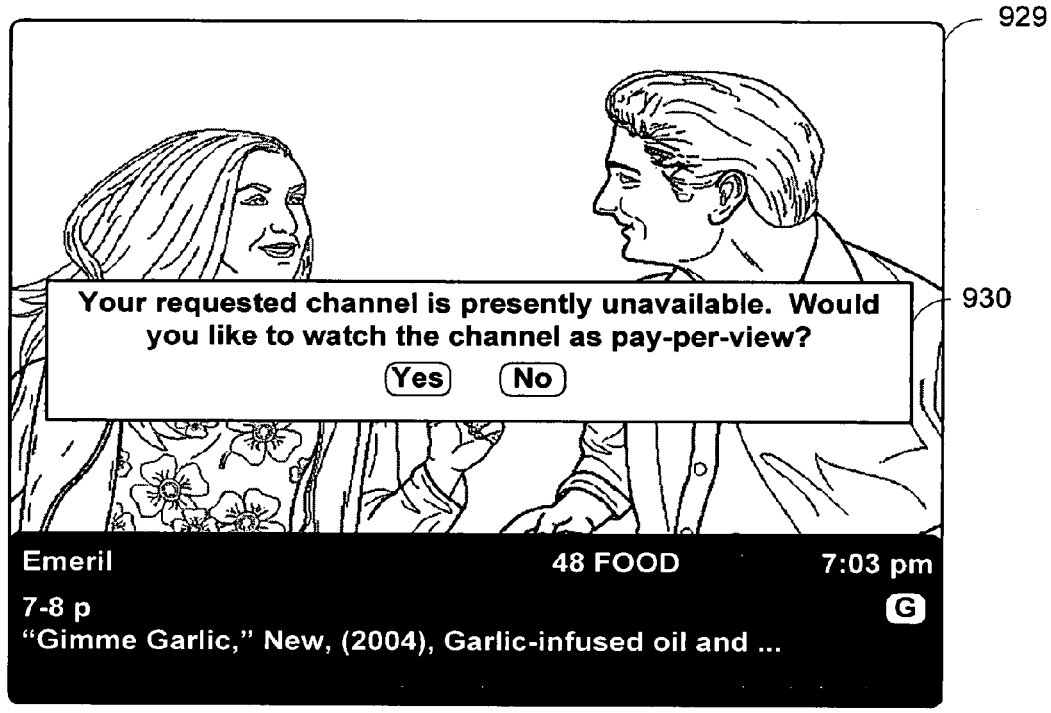
Figure 9N:
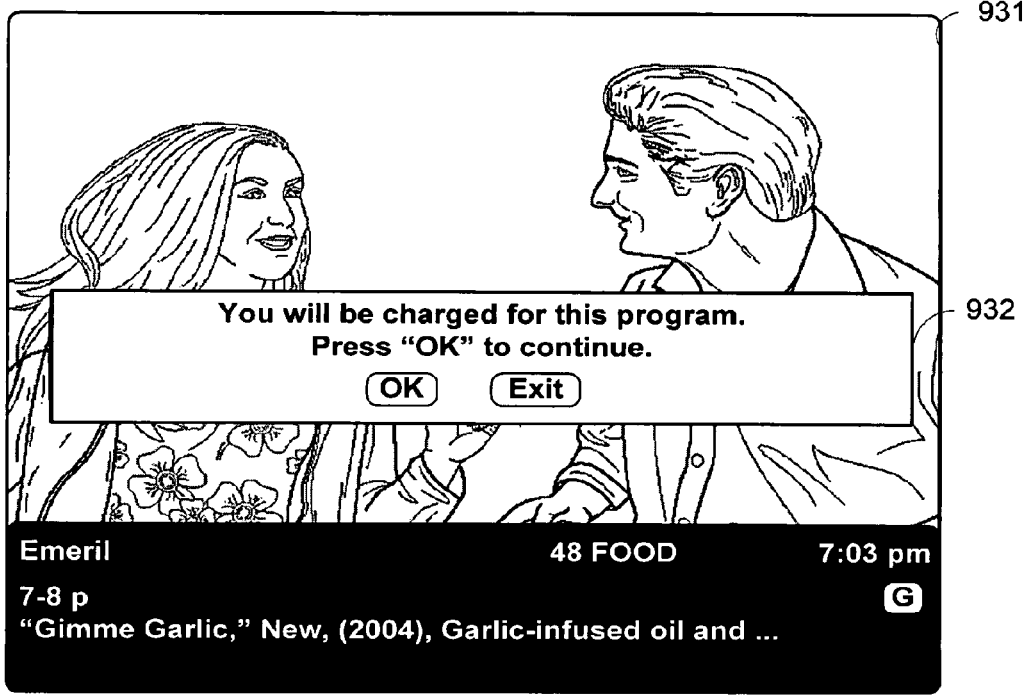
Figure 9O:
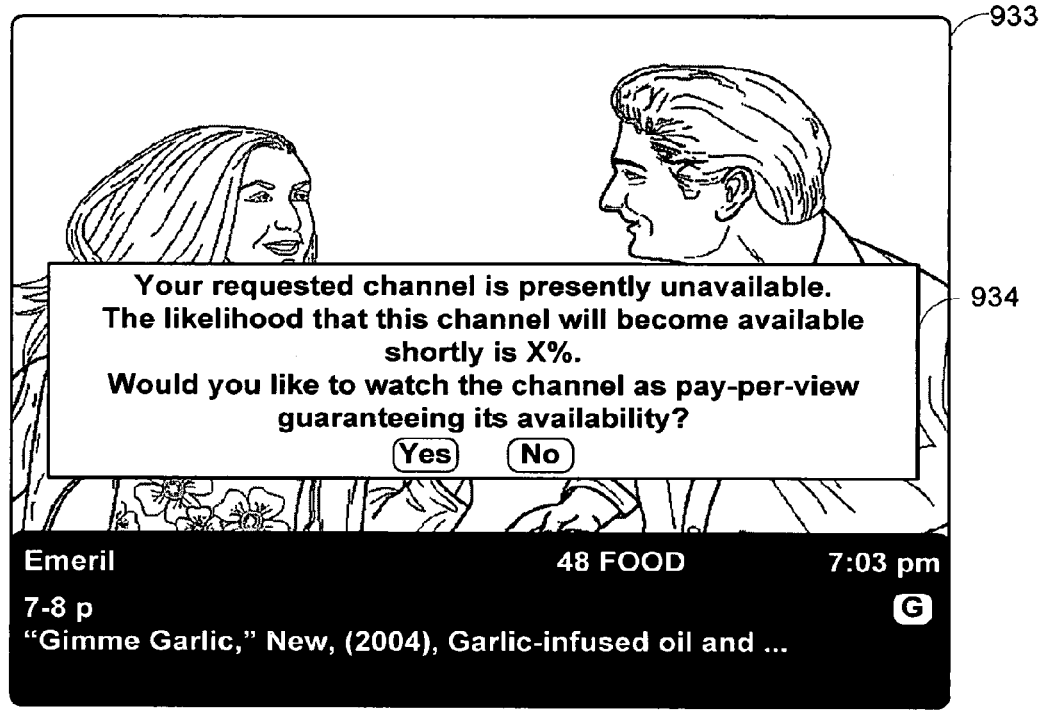
Figure 9P:
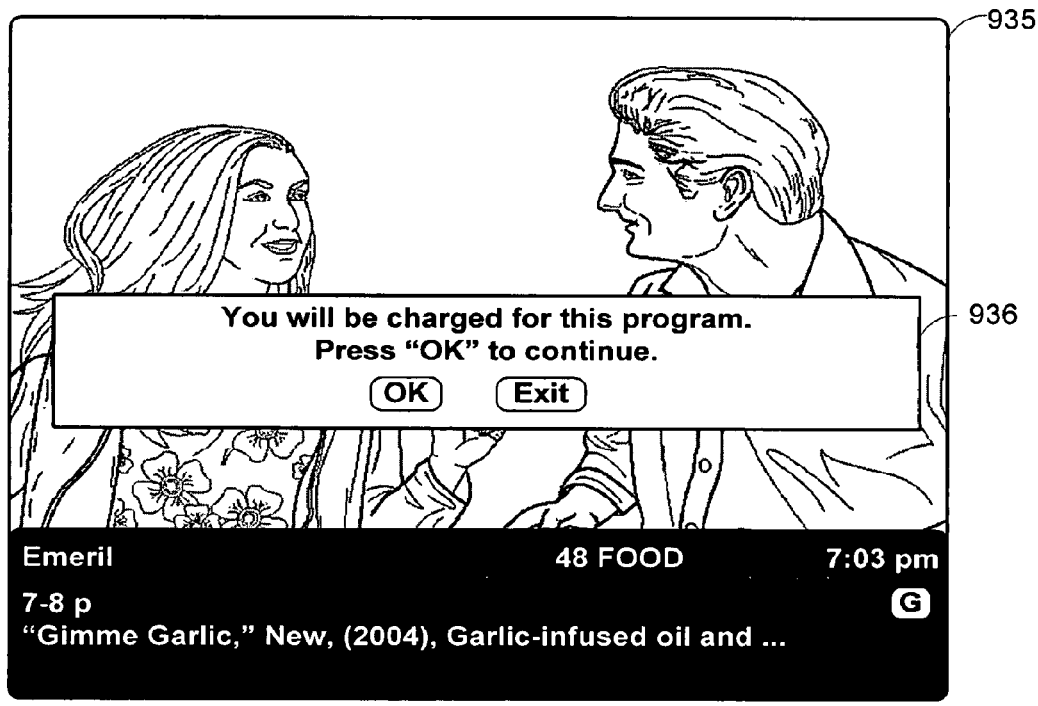

FIGS. 9A-9P show illustrative interactive media guidance application menu display screens in accordance with various embodiments of the present invention. After requesting an unallocated channel, session manager 101 (FIG. 1) may present a requester with any one of menu display screens in FIGS. 9A-9P, while the requester waits for the number of requests to exceed the interest threshold. The screens in 9A-9P are illustrative and may include any possible combination of text associated with the various options given to a requester disclosed in the previous embodiments of FIG. 3.

Client 107 (FIG. 1) may display screen 900 (FIG. 9A) as a requester views grid 901 from which he may select a channel. The interest-based SDV channels and interest-based services in the guide may be starred or otherwise distinguished as in key 902 to indicate that they are available based on interest and may not be immediately available.

Client 107 (FIG. 1) may display screen 903 (FIG. 9B) once a requester selects a channel he or she wishes to watch. A requester may indicate a desire to watch a channel by using arrow keys on a remote and pressing "enter" or using any suitable interactive media guidance function that allows the user to select a response. Channel-interest manager 102 (FIG. 1) continues to check the availability of the requested channel until it is allocated. As the requestor waits for allocation, "One Moment Please" overlay 904 may be displayed over menu 905 containing highlighted channel selection 906.

Client 107 (FIG. 1) may display screen 907 (FIG. 9C) as the requester waits for the channel's allocation in accordance with step 303 of FIG. 3. Overlay 908 may be displayed allowing a requester to indicate a desire to wait for allocation by using arrow keys on a remote and pressing "enter" or using any suitable interactive media guidance function that allows the user to select a response. If "Yes" is selected by the requester, channel-interest manager 102 (FIG. 1) continues to check the availability of the requested channel. If "No" is selected, client 107 (FIG. 1) may give the requester other options (e.g., FIG. 3).

Client 107 (FIG. 1) may display screen 909 (FIG. 9D) as the requester waits for the channel's allocation in accordance with step 303 of FIG. 3. Overlay 910 may be displayed allowing a requester to indicate a desire to view the channel once it is allocated by using arrow keys on a remote and pressing "enter" or using any suitable interactive media guidance function that allows the user to select a response. If "Yes" is selected by the requester, channel-interest manager 102 (FIG. 1) continues to check the availability of the requested channel, tuning that "interested" requester to the channel as it is allocated. If "No" is selected, client 107 (FIG. 1) may give the requester other options, (e.g., FIG. 3).

Client 107 (FIG. 1) may display screen 911 (FIG. 9E) as the requester waits for the channel's allocation in accordance with step 303 of FIG. 3. Overlay 912 may be displayed over the currently viewed channel 913, while the name of the requested channel 914 is displayed at the bottom of screen 911. Channel-interest manager 102 (FIG. 1) continues to check the availability of the requested channel until it is allocated.

Client 107 (FIG. 1) may display screen 915 (FIG. 9F) as the requester waits for the channel's allocation in accordance with step 303 of FIG. 3. Overlay 916 indicates that the channel is presently unavailable and also provides feedback to the requester of the likelihood of allocation in accordance with step 304 of FIG. 3.

Client 107 (FIG. 1) may display screen 917 (FIG. 9G) as the requester waits for the channel's allocation in accordance with step 303 of FIG. 3. Overlay 918 may be displayed allowing a requester to indicate a desire to wait for allocation by using arrow keys on a remote and pressing "enter" or using any suitable interactive media guidance function that allows the user to select a response. If "Yes" is selected by the requester, channel-interest manager 102 (FIG. 1) continues to check the availability of the requested channel until time X has passed. If "No" is selected, client 107 (FIG. 1) may give the requester other options (e.g., FIG. 3).

Client 107 (FIG. 1) may display screen 919 (FIG. 9H) as the requester waits for the channel's allocation in accordance with step 303 of FIG. 3. Overlay 920 may be displayed allowing a requester to indicate a desire to be notified of allocation by using arrow keys on a remote and pressing "enter" or using any suitable interactive media guidance function that allows the user to select a response. If "Yes" is selected by the requester, channel-interest manager 102 (FIG. 1) continues to check the availability of the requested channel, notifying that "previously interested" requester as the channel is allocated. If "No" is selected, client 107 (FIG. 1) may give the requester other options (e.g., FIG. 3). Screen 905 (FIG. 9F) is illustrative of the notification embodiment of the present invention. An interested user may also be notified automatically by channel-interest manager 102 (FIG. 1) tagging the requester as "previously interested" before he or she tunes away from the requested channel (See FIG. 3, step 305).

Client 107 (FIG. 1) may display screen 921 (FIG. 9I) as the requester waits for the channel's allocation in accordance with step 301 of FIG. 3. Overlay 920 may be displayed allowing a requester to indicate a desire to watch related content by using arrow keys on a remote and pressing "enter" or using any suitable interactive media guidance function that allows the user to select a response. If "Yes" is selected by the requester, the STB 105 (FIG. 1) tunes to a previously allocated channel with related content. If "No" is selected, client 107 (FIG. 1) may give the requester other options (e.g., FIG. 3).

Client 107 (FIG. 1) may display screen 923 (FIG. 9J) if the requester selects "Yes" to watching related content before tuning to the allocated channel with related content. Overlay 924 may be displayed allowing a requester to indicate a desire to be notified of allocation by using arrow keys on a remote and pressing "enter" or using any suitable interactive media guidance function that allows the user to select a response. Channel-interest manager 102 (FIG. 1) continues to check the availability of the requested channel, notifying that "previously interested" requester as the channel is allocated. If "No" is selected, client 107 (FIG. 1) may give the requester other options (e.g., FIG. 3).

Client 107 (FIG. 1) may display screen 925 (FIG. 9K) as the requester waits for the channel's allocation in accordance with step 313 of FIG. 3. Overlay 926 may be displayed allowing a requester to indicate a desire to watch the most popular channel by using arrow keys on a remote and pressing "enter" or using any suitable interactive media guidance function that allows the user to select a response. If "Yes" is selected by the requester, the STB 105 (FIG. 1) tunes to a previously allocated channel with the highest number of users at that given moment. If "No" is selected, client 107 (FIG. 1) may give the requester other options (e.g., FIG. 3).

Client 107 (FIG. 1) may display screen 927 (FIG. 9L) if the requester selects "Yes" to watching the most popular channel before tuning to the allocated channel with the highest number of requests. Overlay 928 may be displayed allowing a requester to indicate a desire to be notified of allocation by using arrow keys on a remote and pressing "enter" or using any suitable interactive media guidance function that allows the user to select a response. Channel-interest manager 102 (FIG. 1) continues to check the availability of the requested channel, notifying that "previously interested" requester as the channel is allocated. If "No" is selected, client 107 (FIG. 1) may give the requester other options (e.g., FIG. 3).

Client 107 (FIG. 1) may display screen 929 (FIG. 9M) as the requester waits for the channel's allocation in accordance with step 315 of FIG. 3. Overlay 930 may be displayed allowing a requester to indicate a desire to pay to watch the requested channel by using arrow keys on a remote and pressing "enter" or using any suitable interactive media guidance function that allows the user to select a response. If "Yes" is selected by the requester, the requested channel may be temporarily stored as VOD or as a tier 1 channel, guaranteeing its allocation (See FIG. 3, step 316). If "No" is selected, client 107 (FIG. 1) may give the requester other options (e.g., FIG. 3).

Client 107 (FIG. 1) may display screen 931 (FIG. 9N) if the requester selects "Yes" to watching the channel as pay-per-view before charging the requester. Overlay 932 may be displayed allowing a requester to confirm a desire to pay to watch the requested channel by using arrow keys on a remote and pressing "enter" or using any suitable interactive media guidance function that allows the user to select a response. If "Yes" is selected by the requester, the STB 105 (FIG. 1) tunes to the requested channel in accordance with step 316 of FIG. 3 and the requester is charged. If "Exit" is selected, client 107 (FIG. 1) may give the requester other options (e.g., FIG. 3).

Client 107 (FIG. 1) may display screen 933 (FIG. 9O) as the requester waits for the channel's allocation to bandwidth in accordance with step 315 of FIG. 3. Screen 912 (FIG. 9O) also provides feedback to the requester of likelihood of allocation before the requester commits to paying for the channel. Overlay 934 may be displayed allowing a requester to indicate a desire to pay to watch the requested channel by using arrow keys on a remote and pressing "enter" or using any suitable interactive media guidance function that allows the user to select a response. If "Yes" is selected by the requester, the requested channel may be temporarily stored as VOD or as a tier 1 channel, guaranteeing its allocation (See FIG. 3, step 316). If "No" is selected, client 107 (FIG. 1) may give the requester other options (e.g., FIG. 3).

Client 107 (FIG. 1) may display screen 935 (FIG. 9P) if the requester selects "Yes" to watching the channel as pay-per-view before charging the requester. Overlay 936 may be displayed allowing a requester to confirm a desire to pay to watch the requested channel by using arrow keys on a remote and pressing "enter" or using any suitable interactive media guidance function that allows the user to select a response. If "Yes" is selected by the requester, the STB 105 (FIG. 1) tunes to the requested channel in accordance with step 316 of FIG. 3 and the requester is charged. If "Exit" is selected, client 107 (FIG. 1) may give the requester other options (e.g., FIG. 3).

The screens in FIGS. 9A-9P may also have paid advertisements displayed in the background of the text in accordance with step 312 of FIG. 3.

The above described embodiments of the present invention are presented for purposes of illustration and not of limitation, and the present invention is limited only by the claims which follow. Furthermore, all of the flow charts and processes described above or illustrative. Steps may be added or removed to any of the flow charts, and steps may be performed in a different order.

What is claimed is:

1. A method for providing a start-over feature that allows a user to watch a program from the beginning even through the user has accessed a source for the program after the program has begun, comprising:
    caching a copy of the program in response to identifying a delay in allocation of bandwidth to the source preventing the user from beginning viewing of the program at its originally scheduled time
    providing an option to the user to watch the program after it has already begun at a rate that is faster than the real time rate of the program so that it will fit into a duration that is less than the originally scheduled duration for the program;
    determining a time remaining for the program;
    receiving a selection from the user of the option; and
    in response to receiving the selection by the user of the option, streaming the program to the user from its beginning at a rate that is faster than the real time rate of the program so that the viewing time of the stream is substantially the time remaining in the originally scheduled timeslot for the program.

2. The method of claim 1, algorithmically correcting the pitch of audio in the program so that the pitch of the audio remains substantially the same during play back at the faster rate as it would have been during play back at the real time rate.

3. The method of claim 1, further comprising determining to delay allocation of bandwidth to the source based on interest levels of a plurality of viewers.

4. The method of claim 1, wherein the source is a switched-digital channel in a switched-digital television network.

5. The method of claim 4, further comprising determining whether sufficient bandwidth is available on the switched-digital television network to allocate to the program, and in response, assigning a channel to the program and automatically tuning a set-top box of the user to the assigned channel.

6. A system for providing a start-over feature that allows a user to watch a program from the beginning even through the user has accessed a source for the program after the program has begun, comprising:
    a client application, implemented on user equipment, configured to provide an option to the user to watch the program after it has already begun at a rate that is faster than the real time rate of the program so that it will fit into a duration that is less than the originally scheduled duration for the program, wherein a channel interest manager is configured to route the program to a video server for caching in response to the channel interest manager identifying a delay in allocation of bandwidth to the source preventing the user from beginning viewing of the program at its originally scheduled time; and
    determine a time remaining for the program;
    receive a selection from the user of the option; and
    in response to receiving the selection by the user of the option, receive a stream of the program from its beginning at a rate that is faster than the real time rate of the program so that the viewing time of the stream is substantially the time remaining in the originally scheduled timeslot for the program.

7. The system of claim 6, wherein the video server is configured to algorithmically correct the pitch of audio in the program so that the pitch of the audio remains substantially the same during play back at the faster rate as it would have been during play back at the real time rate.

8. The system of claim 6, wherein the channel interest manager is configured to determine to delay allocation of bandwidth to the source based on interest levels of a plurality of viewers.

9. The system of claim 6, wherein the source is a switched-digital channel in a switched-digital television network.

10. The system of claim 9, wherein the channel interest manager is configured to determine when sufficient bandwidth is available on the switched-digital television network to allocate to the program, and in response, assign a channel to the program, and automatically tune a set-top box of the user to assigned channel.

* * * * *